(12) United States Patent
Takeuchi et al.

(10) Patent No.: US 9,418,790 B2
(45) Date of Patent: Aug. 16, 2016

(54) METHOD FOR MANUFACTURING A MULTILAYER CERAMIC ELECTRONIC COMPONENT

(75) Inventors: Shunsuke Takeuchi, Echizen (JP); Kenichi Kawasaki, Echizen (JP); Akihiro Motoki, Fukui (JP); Makoto Ogawa, Fukui (JP); Shuji Matsumoto, Omihachiman (JP); Seiichi Nishihara, Kameoka (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 1176 days.

(21) Appl. No.: 13/433,320

(22) Filed: Mar. 29, 2012

(65) Prior Publication Data

US 2012/0183682 A1    Jul. 19, 2012

Related U.S. Application Data

(62) Division of application No. 12/340,570, filed on Dec. 19, 2008, now Pat. No. 8,194,391.

(30) Foreign Application Priority Data

Dec. 21, 2007  (JP) ................. 2007-329929
Oct. 20, 2008  (JP) ................. 2008-269758

(51) Int. Cl.
*H05K 3/02* (2006.01)
*H05K 3/10* (2006.01)
(Continued)

(52) U.S. Cl.
CPC ............... *H01G 4/12* (2013.01); *H01G 4/005* (2013.01); *H01G 4/232* (2013.01)

(58) Field of Classification Search
CPC ................ Y10T 29/49117; Y10T 29/49124; Y10T 29/49126; H02G 1/1256; H01L 2924/01079; H01L 2924/01078; H01G 4/129; H01G 4/30; H01G 4/1227
USPC ................ 29/825, 829, 832; 361/320, 321.2, 361/321.4
See application file for complete search history.

(56) References Cited

U.S. PATENT DOCUMENTS 5,659,456 A * 8/1997 Sano et al. ................. 361/321.4
5,734,545 A * 3/1998 Sano et al. ................. 361/321.4
(Continued)

FOREIGN PATENT DOCUMENTS

JP    02-232326 A    9/1990
JP    04077347 A *  3/1992
(Continued)

OTHER PUBLICATIONS

Motoki et al.; "Multilayer Electronic Component and Method for Manufacturing the Same"; U.S. Appl. 12/110,484, filed Apr. 28, 2008.
(Continued)

*Primary Examiner* — Paul D Kim
(74) *Attorney, Agent, or Firm* — Keating & Bennett, LLP

(57) ABSTRACT

A multilayer ceramic electronic component including thin external terminal electrodes each having a superior bonding force to a ceramic base body is provided. In order to form the external terminal electrodes, after Cu plating films are deposited on exposed portions of internal electrodes by direct plating on a ceramic base body, a Cu liquid phase, an $O_2$-containing liquid phase, and a Cu solid phase are generated between the Cu plating film and the ceramic base body by a heat treatment, so that Cu oxides are dispersed in the Cu plating film, at least near an interface with the ceramic base body. Since the Cu oxides function as an adhesive, a bonding force of the Cu plating film to the ceramic base body can be increased, and hence the external terminal electrode having a superior bonding force to the ceramic base body can be obtained.

2 Claims, 28 Drawing Sheets

(51) Int. Cl.
*H01G 4/12* (2006.01)
*H01G 4/005* (2006.01)
*H01G 4/232* (2006.01)

(56) References Cited

U.S. PATENT DOCUMENTS

| | | | | |
|---|---|---|---|---|
| 5,742,473 | A * | 4/1998 | Sano et al. | 361/321.4 |
| 5,841,626 | A * | 11/1998 | Sano et al. | 361/321.5 |
| 6,381,118 | B1 * | 4/2002 | Yokoyama et al. | 361/308.1 |
| 7,373,715 | B2 * | 5/2008 | Hirai et al. | 29/606 |
| 7,463,474 | B2 * | 12/2008 | Ritter et al. | 361/306.1 |
| 7,719,852 | B2 | 5/2010 | Horie et al. | |
| 7,933,113 | B2 * | 4/2011 | Motoki et al. | 361/309 |
| 8,004,386 | B2 * | 8/2011 | Chen et al. | 338/307 |
| 8,125,763 | B2 * | 2/2012 | Kobayashi et al. | 361/309 |
| 8,154,849 | B2 * | 4/2012 | Kunishi et al. | 361/306.3 |
| 2007/0285743 | A1 * | 12/2007 | Hirayama | 358/504 |
| 2008/0123248 | A1 * | 5/2008 | Kunishi et al. | 361/306.3 |

FOREIGN PATENT DOCUMENTS

| | | |
|---|---|---|
| JP | 05-209367 A | 8/1993 |
| JP | 06-090083 A | 3/1994 |
| JP | 11-067554 A | 3/1999 |
| JP | 2001-035739 A | 2/2001 |
| JP | 2003-217969 A | 7/2003 |
| JP | 2004-146401 A | 5/2004 |
| JP | 2005-243944 A | 9/2005 |
| JP | 2005-310621 A | 11/2005 |
| JP | 2007-329929 A | 12/2007 |
| JP | 2008-269758 A | 11/2008 |
| TW | 200503010 A | 1/2005 |
| TW | 200710892 A | 3/2007 |
| TW | 1281167 A | 5/2007 |
| TW | 200729250 A | 8/2007 |
| WO | 2007/049456 A1 | 5/2007 |

OTHER PUBLICATIONS

Motoki et al.; "Multilayer Ceramic Electronic Component and Method for Manufacturing the Same"; U.S. Appl. No. 12/356,648, filed Jan. 21, 2009.

Iwanaga et al.; "Monolithic Ceramic Electronic Component and Method for Manufacturing the Same"; U.S. Appl. No. 12/405,370, filed Mar. 17, 2009.

Iwanaga et al.; "Multilayer Ceramic Electronic Component and Method for Producing Same"; U.S. Appl. No. 12/405,372, filed Mar. 17, 2009.

Kayatani et al.; "Multilayer Ceramic Electronic Component and Method for Making the Same"; U.S. Appl. No. 12/469,799, filed May 21, 2009.

Takeuchi et al.; "Multilayer Ceramic Electronic Component and Manufacturing Method Thereof"; U.S. Appl. No. 12/340,570, filed Dec. 19, 2008.

Kobayashi et al.; "Multilayer Ceramic Electronic Component and Method for Making the Same"; U.S. Appl. No. 12/490,471, filed Jun. 24, 2009.

Nishihara et al.; "Laminated Ceramic Electronic Component and Manufacturing Method Thereof"; U.S. Appl. No. 12/617,879, filed Nov. 13, 2009.

Takeuchi et al.; "Multilayer Electronic Component and Method for Manufacturing the Same"; U.S. Appl. No. 12/817,352, filed Jun. 17, 2010.

Saruban et al.; "Laminated Ceramic Electronic Component and Manufactruing Method Therefor"; U.S. Appl. No. 12/821,305, filed Jun. 23, 2010.

Motoki et al.; "Laminated Ceramic Electronic Component and Manufacturing Method Therefor"; U.S. Appl. No. 13/050,977; filed Mar. 18, 2011.

Official Communication issued in corresponding Japanese Patent Application No. 2008-269758, mailed on Dec. 18, 2012.

* cited by examiner

F I G. 2
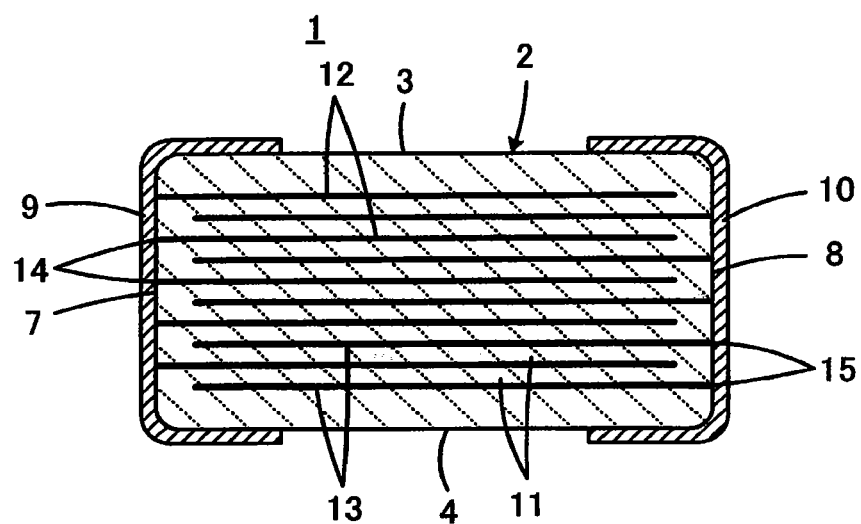

F I G. 3 A
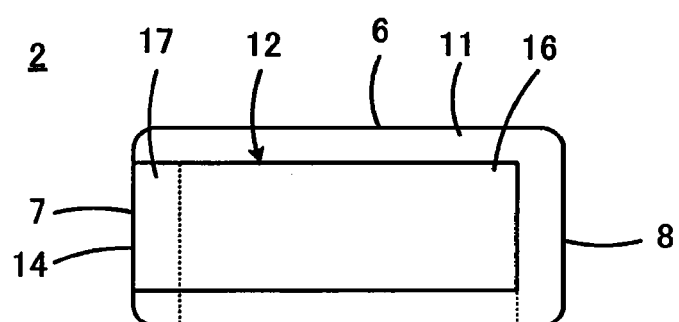
F I G. 3 B
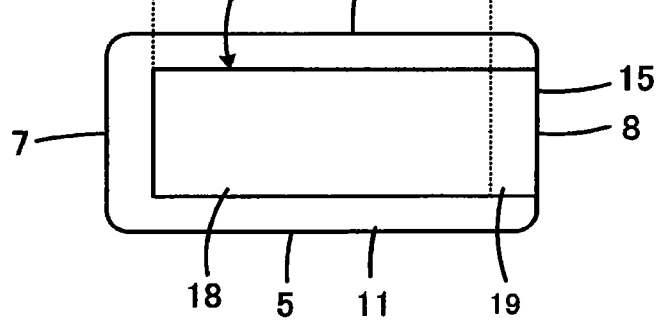

F I G. 4
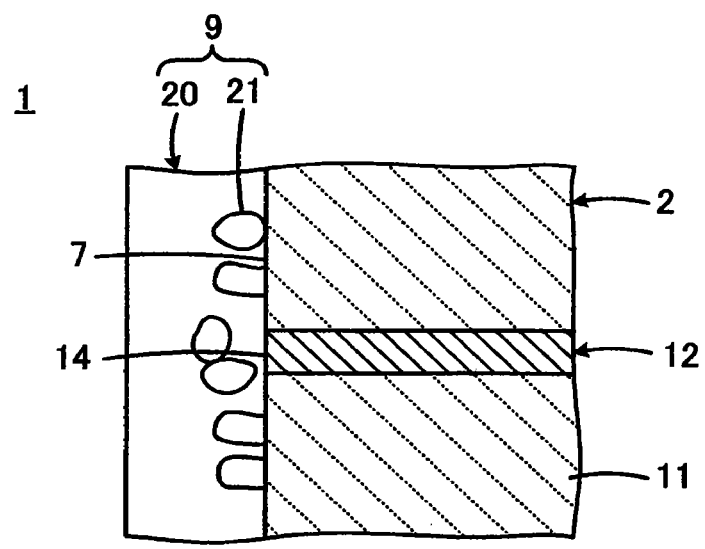

F I G. 9A
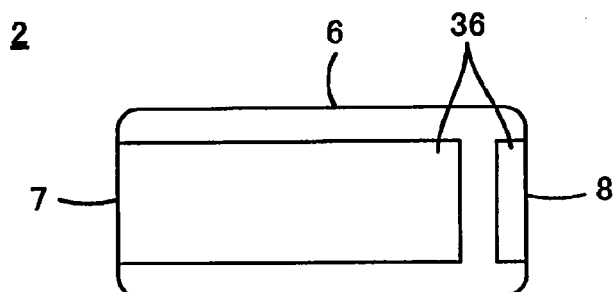
F I G. 9B
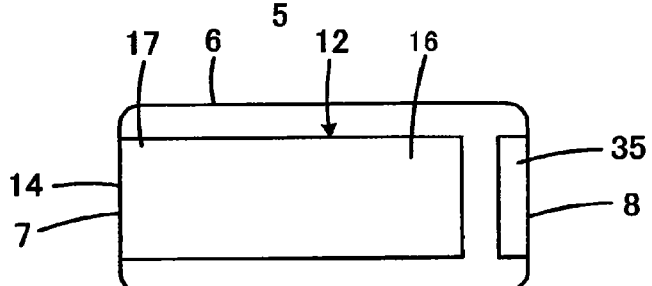
F I G. 9C
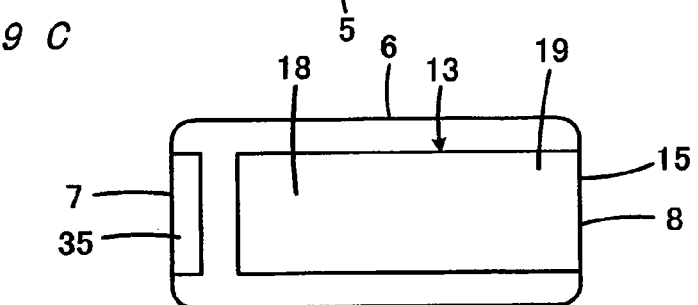
F I G. 9D
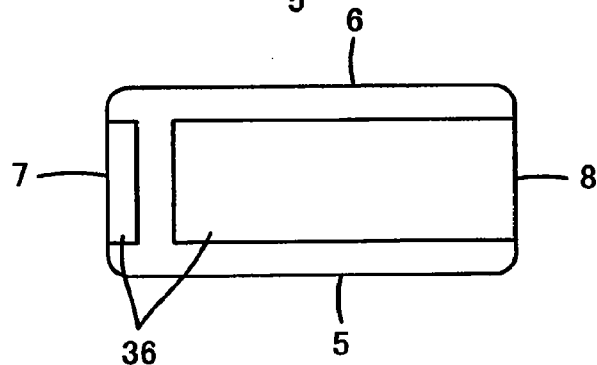

F I G. 2 6 A
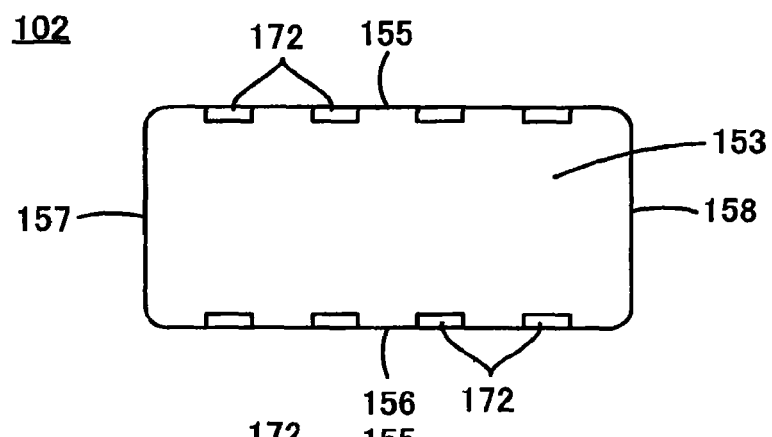
F I G. 2 6 B
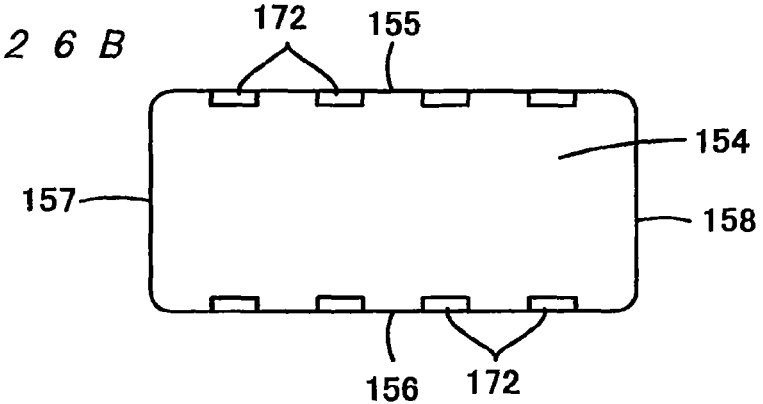

F I G . 2 7
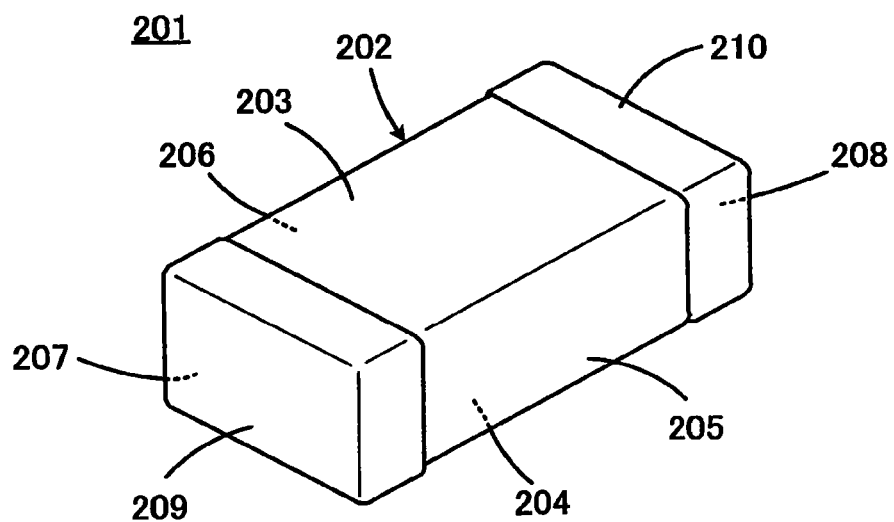

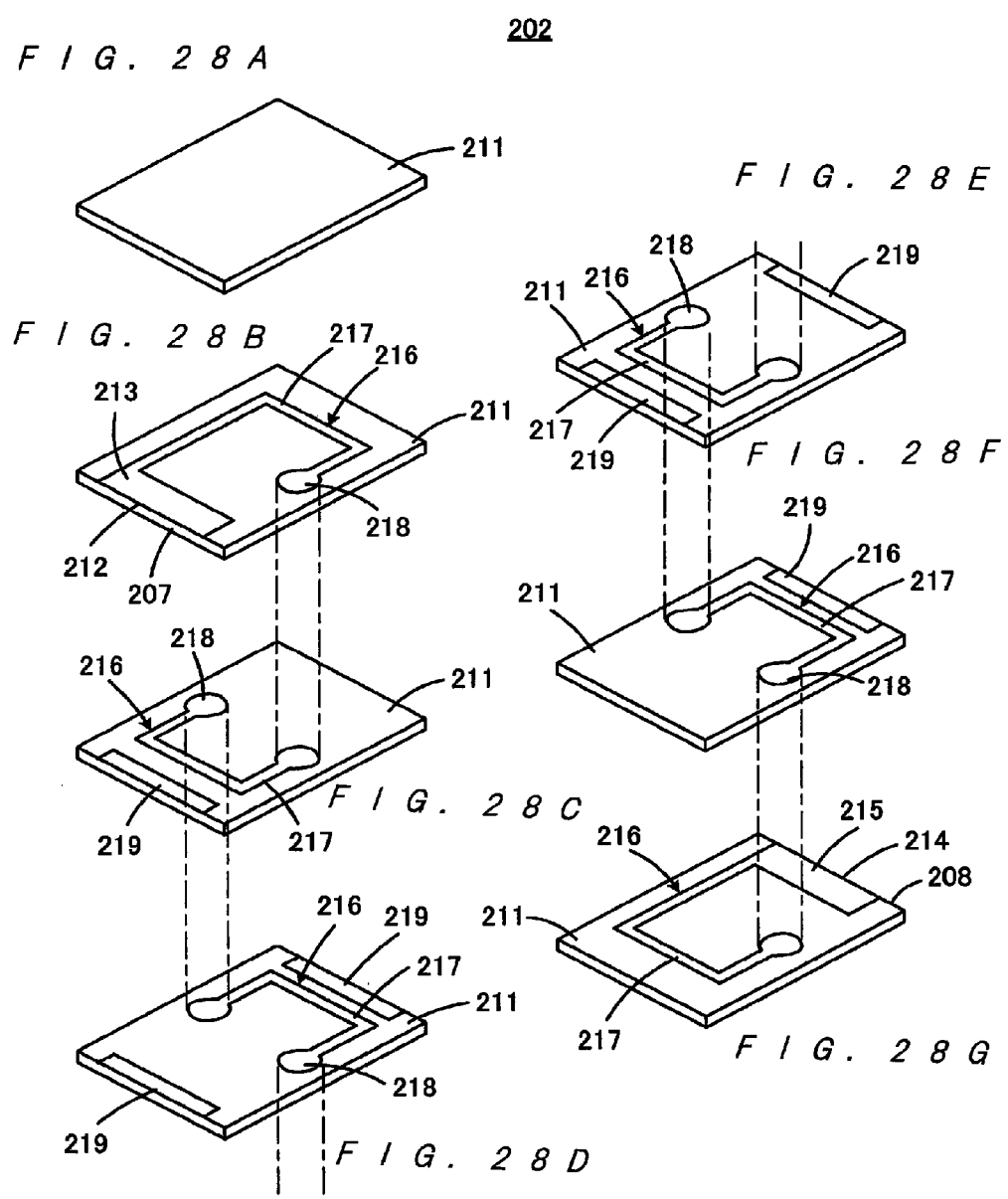

METHOD FOR MANUFACTURING A MULTILAYER CERAMIC ELECTRONIC COMPONENT

This is a division of application Ser. No. 12/340,570 filed Dec. 18, 2008, now U.S. Pat. No. 8,194,391.

BACKGROUND OF THE INVENTION

1. Field of the Invention

The present invention relates to a multilayer ceramic electronic component and a manufacturing method thereof, and more particularly relates to the structure of external terminal electrodes provided in a multilayer ceramic electronic component and a method for forming the external terminal electrodes.

2. Description of Related Art

In recent years, the market for compact portable electronic devices, such as mobile phones, notebook personal computers, digital cameras, and digital audio devices, has been expanded. In the field of portable electronic devices, reduction in size and improvement in performance have been simultaneously advanced. Many multilayer ceramic electronic components are mounted in one portable electronic device, and therefore, the multilayer ceramic electronic components are also required to be reduced in size and to be improved in performance. For example, a multilayer ceramic capacitor is required to be reduced in size and to be increased in capacity.

As means for reducing the size of a multilayer ceramic capacitor and for increasing the capacity thereof, a decrease in thickness of ceramic layers is effective, and in recent year, ceramic layers having a thickness of approximately 3 µm have been practically used. A further decrease in the thickness of ceramic layers has been attempted but as the thickness of the ceramic layers is decreased, short-circuiting is liable to occur between internal electrodes, and as a result, it becomes disadvantageously difficult to ensure the quality.

As another means, it has been conceived to increase the effective area of any internal electrode. However, when mass production of multilayer ceramic capacitors is performed, in consideration of errors in stacking ceramic green sheets and/or cutting a laminate of ceramic green sheets, a side margin between the internal electrode and a side surface of a ceramic base body and an end margin between the internal electrode and an end surface of the ceramic base body must be ensured to a certain extent. Hence, an increase in effective area of the internal electrode is restricted.

In order to increase the effective area of the internal electrode while providing predetermined margins, the area of the ceramic layer must be increased. However, an increase in the area of the ceramic layer within a predetermined dimensional standard is restricted, and additionally, the thickness of an external terminal electrode disturbs the increase in the area of the ceramic layer.

Heretofore, external terminal electrodes of a multilayer ceramic capacitor are formed by applying a conductive paste to end portions of a ceramic base body, followed by firing. As a method for applying a conductive paste, the method in which an end portion of the ceramic base body is immersed in a conductive paste bath and is then removed therefrom is primarily performed; however, the conductive paste tends to adhere thick to a central part of the end surface of the ceramic base body due to the viscosity of the conductive paste in this method. Hence, the thickness of the external terminal electrode is partly increased (for example, in particular, to more than approximately 30 µm), and in order to offset the above increase, the area of the ceramic layer must be decreased.

In order to solve the above problem, a method in which the external terminal electrode is directly formed by plating has been proposed (for example, see International Publication No. WO 2007/049456 Pamphlet). According to this method, a plating film is deposited using exposed portions of internal electrodes located at an end surface of a ceramic base body as nuclei, and as the plating film is grown, the exposed portions of the internal electrodes adjacent to each other are connected to each other. Hence, by this method, compared to the method using a conductive paste, a thin and flat external terminal electrode can be formed.

However, the adhesive effect of glass, which was obtained in the method using a conductive paste, cannot be obtained in the plating method, and there has been a problem in that a bonding force of the plating film, that is, the external terminal electrode, to the ceramic base body is not sufficient.

SUMMARY OF THE INVENTION

Accordingly, it is an object of the present invention to provide a multilayer ceramic electronic component including external terminal electrodes each having a small thickness and a superior bonding force to a ceramic base body, and a method for manufacturing the multilayer ceramic electronic component.

A multilayer ceramic electronic component according to a preferred embodiment of the present invention includes: a ceramic base body having ceramic layers stacked one upon another; internal conductors provided in the ceramic base body and having exposed portions at external surfaces of the ceramic base body; and external terminal electrodes which are provided on the external surfaces of the ceramic base body to cover the exposed portions of the internal conductors. In this multilayer ceramic electronic component, in order to solve the technical problems described above, each of the external terminal electrodes includes a Cu plating film which covers the exposed portions of the internal conductors and a Cu oxide which is dispersed in the Cu plating film at least near the interface thereof with the ceramic base body.

The Cu oxide described above presents as particles in many cases.

The Cu oxide may include $Cu_2O$ and $CuO$ in some cases, and in one case, the Cu oxide includes $Cu_2O$ at approximately 90 percent by weight or more.

The internal conductors may include dummy internal conductors which are not substantially responsible for electrical properties.

The above multilayer ceramic electronic component according to a preferred embodiment of the present invention may further include auxiliary conductors on the external surfaces of the ceramic base body in regions in which the exposed portions of the internal conductors are not formed and between the external terminal electrodes and the ceramic base body. In this case, the auxiliary conductors preferably include glass.

When the multilayer ceramic electronic component according to a preferred embodiment of the present invention forms a capacitor array, a multi-terminal type ESL (equivalent series inductance) capacitor, or the like, the exposed portions of the internal conductors at the external surfaces of the ceramic base body form at least four lines, and at least four external terminal electrodes are formed so as to cover the lines of the exposed portions of the internal conductors.

When the multilayer ceramic electronic component according to a preferred embodiment of the present invention forms a multilayer ceramic capacitor or a multilayer ceramic inductor, typically, the ceramic base body has a first and a second primary surface facing each other and four side surfaces connecting the first and the second primary surfaces to each other, and the external terminal electrodes include a first external terminal electrode provided at a first position on the side surfaces and a second external terminal electrode provided at a second position on the side surfaces, the first and the second positions being different from each other.

In the embodiment described above, when the multilayer ceramic electronic component according to a preferred embodiment of the present invention forms a multilayer ceramic capacitor, the internal conductors include at least one first internal electrode having an exposed portion at the first position on the side surfaces and electrically connected to the first external terminal electrode and at least one second internal electrode having an exposed portion at the second position on the side surfaces and electrically connected to the second external terminal electrode, and the first and the second internal electrodes face each other with a ceramic layer inbetween.

When the multilayer ceramic electronic component according to a preferred embodiment of the present invention forms a multilayer ceramic inductor, the internal conductors include a first internal conductor having an exposed portion at the first position on the side surfaces and a second internal conductor having an exposed portion at the second position on the side surfaces and disposed at a position different from that of the first internal conductor in a direction in which the ceramic layers are stacked, and in addition, the multilayer ceramic electronic component further includes a coil conductor coiling to electrically connect the first internal conductor and the second internal conductor.

When the four side surfaces described above includes a first and a second side surface facing each other and a third and a fourth side surface facing each other, the first external terminal electrode may be formed only on the third side surface, and the second external terminal electrode may be formed only on the fourth side surface. In this case, a first edge-side conductor is preferably formed on respective parts of the first and the second primary surfaces and the first and the second side surfaces and electrically connected to the first external terminal electrode only at the periphery thereof, and a second edge-side conductor is preferably formed on respective parts of the first and the second primary surfaces and the first and the second side surfaces and electrically connected to the second external terminal electrode only at the periphery thereof.

The present invention may also be applied to a method for manufacturing a multilayer ceramic electronic component as described above.

A method for manufacturing a multilayer ceramic electronic component according to a preferred embodiment of the present invention includes the steps of: fabricating a ceramic base body which includes ceramic layers stacked one upon another and internal conductors having exposed portions exposed at external surfaces of the ceramic base body; performing a plating treatment on the ceramic base body to deposit Cu plating films on the exposed portions of the internal conductors; and performing a heat treatment on the ceramic base body so as to generate a Cu liquid phase, an $O_2$-containing liquid phase, and a Cu solid phase between the Cu plating films and the ceramic base body.

The heat treatment is preferably performed at a temperature of approximately 1,065° C. or more in an atmosphere with an oxygen concentration of approximately 50 ppm or more.

According to an embodiment of the present invention, by performing a heat treatment under predetermined conditions to a ceramic base body on which Cu plating films are formed, a Cu liquid phase, an $O_2$-containing liquid phase, and a Cu solid phase are generated between each of the Cu plating films and the ceramic base body. The mixed phases are likely to segregate in each of the Cu plating films at least near the interface thereof with the ceramic base body. When being cooled thereafter, the above Cu liquid phase and the $O_2$-containing liquid phase turn into a solid, so that Cu oxides are generated. The Cu oxides are dispersed in each of the Cu plating films at least near the interface thereof with the ceramic base body. In this state, since the Cu oxides function as an adhesive for strongly bonding the Cu plating film to the ceramic base body, the bonding force of the external terminal electrodes, each including the Cu plating film, to the ceramic base body can be increased. As a result, a multilayer ceramic electronic component including external terminal electrodes which have a superior bonding force to the ceramic base body can be obtained.

In addition, since each of the Cu plating films included in the external terminal electrodes is formed by plating, compared to the case of using a conductive paste, the Cu plating film can be formed to be thin and flat. Hence, since the size of a multilayer ceramic electronic component can be reduced, and the volume of the ceramic base body can be increased within a predetermined dimensional standard, the performance of the multilayer ceramic electronic component can be improved. In particular, when the above Cu plating film is applied to a multilayer ceramic capacitor, the capacity can be increased within a predetermined dimensional standard.

In the case in which the above Cu oxides include $Cu_2O$ and CuO, the Cu oxides include $Cu_2O$, which enables strong diffusion bonding with ceramic, preferably at approximately 90 percent by weight or more. Thereby, the bonding force of the external terminal electrodes to the ceramic base body can be further increased.

When the internal conductors include a dummy internal conductor, the bonding force of the external terminal electrodes to the ceramic base body can be further increased.

When auxiliary conductors are formed on external surfaces of the ceramic base body in regions in which the exposed portions of the internal electrodes are not formed, the external terminal electrodes can be easily extended, and as a result, the bonding force of the external terminal electrodes to the ceramic base body can be further increased.

When the ceramic base body has a first and a second side surface facing each other and a third and a fourth side surface facing each other, a first external terminal electrode is formed only on the third side surface, and a second external terminal electrode is formed only on the fourth side surface. Further, a first edge-side conductor is formed on respective parts of the first and the second primary surfaces and the first and the second side surfaces and is electrically connected to the first external terminal electrode only at the periphery thereof, and a second edge-side conductor is formed on respective parts of the first and the second primary surfaces and the first and the second side surfaces and is electrically connected to the second external terminal electrode only at the periphery thereof. In this case, a plating step of forming the external terminal electrodes can be performed in a relatively short period of time, and by the presence of the edge-side conductors, bonding reliability at the time of mounting of the multilayer ceramic electronic component by soldering can be improved. Furthermore, since intrusion of moisture and the like into the ceramic base body from the outside of the external terminal electrodes can be surely suppressed, the reliability of the multilayer ceramic capacitor can be improved.

In a method for manufacturing the multilayer ceramic electronic component according to a preferred embodiment of the present invention, by performing the heat treatment at a temperature of approximately 1,065° C. or more in an atmosphere with an oxygen concentration of approximately 50 ppm or more, a sufficient Cu liquid phase and $O_2$-containing liquid phase can be reliably generated.

Other features, elements, characteristics and advantages of the present invention will become more apparent from the following detailed description of preferred embodiments of the present invention with reference to the attached drawings.

BRIEF DESCRIPTION OF THE DRAWINGS

FIG. 2 is a cross-sectional view taken along the line A-A of FIG. 1;

FIGS. 3A and 3B are plan views showing the internal structure of a ceramic base body 2 of the multilayer ceramic capacitor 1 shown in FIG. 1;

FIG. 4 is an enlarged cross-sectional view showing a part of the cross-sectional view shown in FIG. 2;

FIGS. 9A to 9D are views corresponding to FIGS. 3A and 3B and illustrating the fifth embodiment of the present invention;

FIGS. 26A and 26B are plan views illustrating the twelfth embodiment of the present invention and showing a first and a second primary surface 153 and 154, respectively, of the ceramic base body 152 before external terminal electrodes 168 and 169 are formed;

FIG. 27 is a perspective view showing the appearance of a multilayer ceramic inductor 201 according to a thirteenth embodiment of the present invention; and FIGS. 28A to 28G are perspective views showing an exploded ceramic base body 202 of the multilayer ceramic inductor 201 shown in FIG. 27.

DESCRIPTION OF THE PREFERRED EMBODIMENTS

Figure 1:
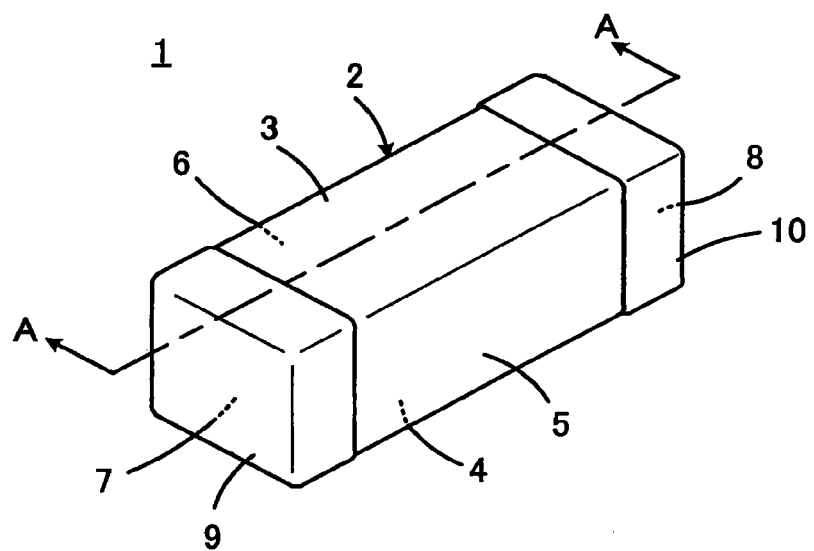
FIG. 1 is a perspective view showing the appearance of a multilayer ceramic capacitor 1 according to a first embodiment of the present invention.

FIGS. 1 to 4 are views illustrating a first embodiment of the present invention. FIG. 1 is a perspective view showing a multilayer ceramic capacitor 1 as one example of a multilayer ceramic electronic component. FIG. 2 is a cross-sectional view taken along the line A-A of FIG. 1.

The multilayer ceramic capacitor 1 has a ceramic base body 2. The ceramic base body 2 is in the shape of a substantially rectangular parallelepiped having a first and a second primary surface 3 and 4 facing each other, and four side surfaces 5 to 8 connecting the first and the second primary surfaces 3 and 4. In the following description, among the four side surfaces 5 to 8, the side surfaces 5 and 6 extending along the longer sides of the primary surfaces 3 and 4 are called a first and a second side surface, respectively, and the side surfaces 7 and 8 extending along the shorter sides of the primary surfaces 3 and 4 are called a first and a second end surface, respectively.

A first and a second external terminal electrode 9 and 10 are formed on the first and the second end surfaces 7 and 8, respectively, of the ceramic base body 2.

As primarily shown in FIG. 2, the ceramic base body 2 has the structure in which ceramic layers 11 are stacked one upon another. Inside the ceramic base body 2, among the ceramic layers 11, first internal electrodes 12 and second internal electrodes 13 are formed alternately in the direction in which the ceramic layers are stacked. Each of the first internal electrodes 12 has an exposed portion 14 exposed at the first end surface 7, and each of the second internal electrodes 13 has an exposed portion exposed at the second end surface 8. The exposed portions 14 of the first internal electrodes 12 are covered with the first external terminal electrode 9 and are electrically connected thereto. The exposed portions 15 of the second internal electrodes 13 are covered with the second external terminal electrode 10 and are electrically connected thereto.

FIGS. 3A and 3B are plan views showing the internal structure of the ceramic base body 2. FIG. 3A shows a cross-section along which the first internal electrode 12 is provided, and FIG. 3B shows a cross-section along which the second internal electrode 13 is provided.

As shown in FIGS. 3A and 3B, the first and second internal electrodes 12 and 13 are substantially rectangular planes. The first internal electrode 12 has a first capacity portion 16 facing the second internal electrode 13 and a first extension portion 17 extending from the first capacity portion 16 to the first end surface 7. Likewise, the second internal electrode 13 has a second capacity portion 18 and a second extension portion 19.

FIG. 4 shows a part of FIG. 2, and more specifically, is an enlarged view of a portion at which the first external terminal electrode 9 is formed.

As shown in FIG. 4, the first external terminal electrode 9 includes a Cu plating film 20 formed on the first end surface 7 so as to cover the exposed portions 14 of the first internal electrodes 12. Although not shown in the figure, the second external terminal electrode 10 also includes a Cu plating film 20. The thickness of the Cu plating film 20 is preferably in the range of approximately 1 to 10 µm.

Inside the Cu plating film 20, at least near the interface with the ceramic base body 2, Cu oxides 21 are dispersed. In FIG. 4, as one example of the dispersive presence of Cu oxides 21, the Cu oxides 21 are shown to be present as particles; however, the Cu oxides 21 are not necessarily dispersed particles as shown in FIG. 4, and the Cu oxides 21 may be present in stripes. The Cu oxides function to tightly bond the external terminal electrodes 9 and 10 to the ceramic base body 2. This function will be described later in detail. The Cu oxides 21 may include $Cu_2O$ and $CuO$. In the Cu oxides 21, the content of $Cu_2O$ is preferably approximately 90 percent by weight or more.

The ceramic layer 11 is formed from a dielectric ceramic material primarily composed of $BaTiO_3$, $CaTiO_3$, $SrTiO_3$, $CaZrO_3$, or the like. At least one accessory component, such as a Mn compound, an Fe compound, a Cr compound, a Co compound, or a Ni compound, may also be added to the above primary component. In addition, the thickness of the ceramic layer 11 after firing is preferably set, for example, in the range of approximately 1 to 10 µm.

The size of the ceramic base body 2 may be in accordance with, for example, 0402 size, 0603 size, 1005 size, 1608 size, 2012 size, 3216 size, or 3225 size under JEITA standard; however, in consideration of reduction in size and increase in capacity, the present invention is particularly advantageous to components of the 1005 size to the 2012 size.

As a conductive component included in the internal electrodes 12 and 13, for example, Ni, Cu, Ag, Pd, an Ag—Pd alloy, or Au may be used. When the reactivity with Cu and the Cu oxide 21, such as $Cu_2O$ or $CuO$, which may be contained in the Cu plating film 20, is taken into consideration, in particular, Ni is preferable. In addition, the thickness of each of the internal electrodes 12 and 13 after firing is preferably in the range of approximately 0.5 to 2.0 µm.

Next, one example of a method for manufacturing the above multilayer ceramic capacitor 1 will be described.

First, ceramic green sheets to be formed into the ceramic layers 11 and a conductive paste for the internal electrodes 12 and 13 are prepared. Binders and solvents are contained in the ceramic green sheets and the conductive paste, and as the binders and solvents, known organic binders and organic solvents may be used.

Next, the conductive paste is printed on ceramic green sheets in a predetermined pattern, for example, by a screen printing method. Thereby, ceramic green sheets on which conductive films to serve as the internal electrodes 12 and 13 are formed are obtained.

Subsequently, a predetermined number of ceramic green sheets with the conductive films as described above are stacked one upon another in a predetermined order, and a predetermined number of ceramic green sheets with no conductive films are placed on the top and the bottom of the above stacked ceramic green sheets as exterior layers, so that a green mother laminate is obtained. The green mother laminate is pressed in the direction in which the ceramic green sheets are stacked so that the ceramic green sheets are bonded with one another, whenever necessary, by a hydrostatic press or the like.

Next, the green mother laminate is cut into pieces of a predetermined size, so that green ceramic base bodies 2 are obtained.

Subsequently, the green ceramic base bodies 2 are fired. Although the firing temperature depends on the ceramic material contained in the ceramic green sheets and a metal material contained in the conductive paste film, it is preferably, for example, in the range of approximately 900 to 1,300° C.

Next, whenever necessary, a polishing treatment, such as barrel polishing, is performed on each ceramic body 2 so that the exposed portions 14 and 15 of the internal electrodes 12 and 13 will appear on the surface of the ceramic body 2. By the polishing treatment, simultaneously, ridge and corner portions of the ceramic base body 2 are rounded. In addition, whenever necessary, a hydrophobic treatment is performed so that a plating solution will be prevented from intruding into spaces between the exposed portions 14 and 15 of the internal electrodes 12 and 13 and the ceramic layers 11.

Subsequently, a plating treatment is performed on the ceramic base body 2, so that Cu plating films 20 are deposited on the exposed portions 14 and 15 of the first and the second internal electrodes 12 and 13. As the Cu plating, either electrolytic Cu plating or electroless Cu plating may be used; however, in the case of electroless Cu plating, since a pretreatment must be performed using a Pd catalyst or the like in order to improve a plating deposition rate, the process is disadvantageously complicated. Hence, it is preferable to use electrolytic Cu plating. In addition, in order to facilitate the formation of the Cu plating films 20, strike Cu plating is preferably performed before the electrolytic Cu plating or the electroless Cu plating is carried out. Furthermore, for the plating treatment, barrel plating is preferably used.

Next, a heat treatment is performed on the ceramic base body 2, so that a Cu liquid phase, an $O_2$-containing liquid phase, and a Cu solid phase are generated between each of the Cu plating films 20 and the external surface of the ceramic base body 2. The mixed phases described above are likely to segregate at the interface between each of the Cu plating films 20 and the external surface of the ceramic base body 2. The reason for this is believed that the liquid phases are likely to move toward minute spaces between the Cu plating film 20 and the external surface of the ceramic base body 2 and minute voids formed in the surface thereof.

The heat treatment is performed preferably at a temperature of approximately 1,065° C. or more and an oxygen concentration of approximately 50 ppm or more. When the temperature is less than 1,065° C., and/or when the oxygen concentration is less than 50 ppm, the Cu liquid phase and the $O_2$-containing liquid phase may not be sufficiently generated in some cases. The upper limit of the heat treatment temperature is preferably set so as not to exceed the melting point of Cu and is, in particular, preferably less than 1,084° C.

Subsequently, the ceramic base body 2 is cooled to room temperature. In this step, the Cu liquid phase and the $O_2$-containing liquid phase which segregate at the interface described above are solidified, so that the Cu oxides 21 are formed. The Cu oxides 21 tightly bond the Cu plating film 20 to the ceramic base body 2. In particular, diffusion bonding between $Cu_2O$ and the ceramic secures tighter bonding between the Cu plating and the ceramic base body 2. In addition, since the Cu oxides 21 seal spaces between the Cu plating film 20 and the ceramic base body 2, moisture is not liable to enter from the outside, and hence the reliability of the multilayer ceramic capacitor 1 can be improved.

Figure 5:
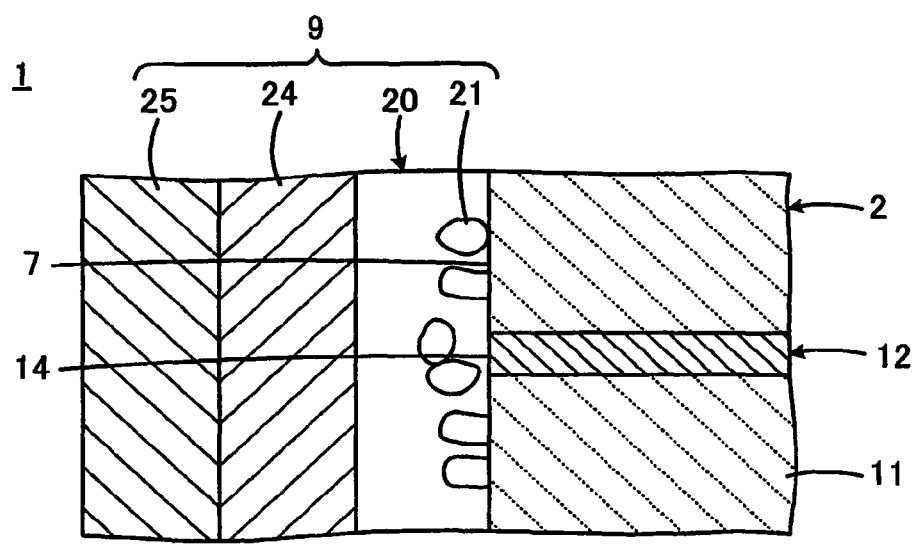
FIG. 5 is a view corresponding to FIG. 4 and illustrating a second embodiment of the present invention.

FIG. 5 is a view corresponding to FIG. 4 and illustrating a second embodiment of the present invention. In FIG. 5, elements corresponding to the elements shown in FIG. 4 are designated by the same reference numerals, and a duplicated description will be omitted.

In the second embodiment, a first outside conductive layer 24 and a second outside conductive layer 25 are further formed on each of the Cu plating films 20.

The first outside conductive layer 24 is composed of a metal selected from the group consisting of Cu and Ni or an alloy containing the metal of the group. The first outside conductive layer 24 functions as a barrier layer to prevent each of the Cu plating films 20 from being corroded by solder, which is used, for example, for mounting of the ceramic capacitor 1. In addition, when the first outside conductive layer 24 is composed of Cu, the Cu first outside conductive layer 24 increases the thickness of the Cu film of the Cu plating film 20 and functions as a barrier layer against solder.

The second outside conductive layer 25 is composed of one metal selected from the group consisting of Sn, Pb, Au, Ag, Pd, Bi, and Zn, or an alloy containing a metal of the group. A material forming the second outside conductive layer 25 is optionally selected in consideration of the affinity with a material used for mounting of the multilayer ceramic capacitor 1, for example, with a solder material used for mounting by soldering, with a conductive adhesive used for mounting by conductive adhesive or with Au used for mounting by wire bonding.

Figure 6:
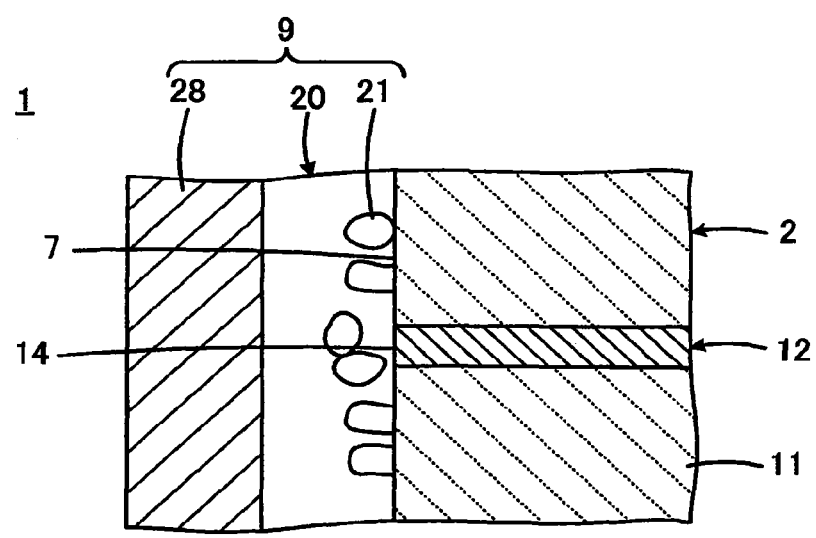
FIG. 6 is a view corresponding to FIG. 4 and illustrating a third embodiment of the present invention.

FIG. 6 is a view corresponding to FIG. 4 and illustrating a third embodiment of the present invention. In FIG. 6, elements corresponding to the elements shown in FIG. 4 are designated by the same reference numerals, and a duplicated description will be omitted.

In the third embodiment, an outside conductive layer 28 is further formed on each of the Cu plating films 20. The outside conductive layer 28 is composed of one metal selected from the group consisting of Au, Ag, and Pd or an alloy containing a metal of the group. The third embodiment is advantageously used when the multilayer ceramic capacitor 1 is to be mounted not by soldering but by, for example, conductive adhesive or wire bonding. According to the third embodiment, compared to the second embodiment, the number of layers of each of the external terminal electrodes 9 and 10 can be decreased.

Figure 7:
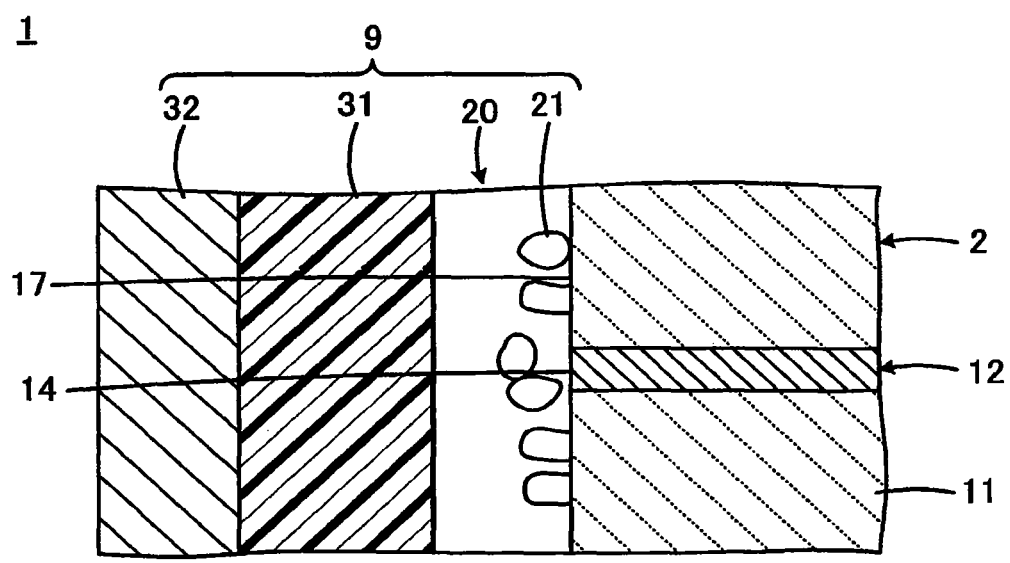
FIG. 7 is a view corresponding to FIG. 4 and illustrating a fourth embodiment of the present invention.

FIG. 7 is a view corresponding to FIG. 4 and illustrating a fourth embodiment of the present invention. In FIG. 7, elements corresponding to the elements shown in FIG. 4 are designated by the same reference numerals, and a duplicated description will be omitted.

In the fourth embodiment, a first outside conductive layer 31 and a second outside conductive layer 32 are further provided on each of the Cu plating films 20. The first outside conductive layer 31 is composed of a conductive resin including a thermosetting resin and a metal filler. The second outside conductive layer 32 is composed of one metal selected from the group consisting of Cu, Ni, Sn, Pb, Au, Ag, Pd, Bi, and Zn or an alloy containing a metal of the group.

According to the fourth embodiment, when an external stress is applied to the multilayer ceramic capacitor 1, the resin component included in the first outside conductive layer 31 absorbs the stress, or the first outside conductive layer 31 and the second outside conductive layer 32 peel off from each other as a fail-safe function. Thereby, the stress is suppressed from being directly applied to the ceramic base body 2, and as a result, the ceramic base body 2 can be suppressed from being cracked.

Figure 8:
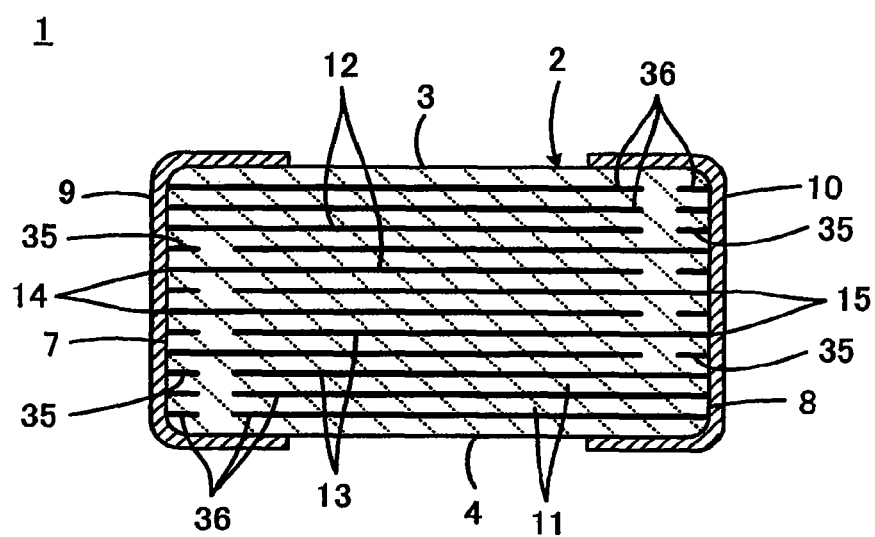
FIG. 8 is a cross-sectional view corresponding to FIG. 2 and illustrating a fifth embodiment of the present invention.

FIGS. 8 and 9A to 9D are views illustrating a fifth embodiment of the present invention. FIG. 8 corresponds to FIG. 2, and FIGS. 9A to 9D correspond to FIGS. 3A and 3B. In FIGS. 8 and 9A to 9D, elements corresponding to the elements shown in FIGS. 2 and 3 are designated by the same reference numerals, and a duplicated description will be omitted.

In the fifth embodiment, dummy internal conductors 35 and 36 which are not substantially responsible for electrical properties of the multilayer ceramic capacitor 1 are formed in the ceramic base body 2. In this embodiment, the dummy internal conductors 35 are inner layer dummy internal conductors each formed on a level with each of the first and the second internal electrodes 12 or 13, and the dummy internal conductors 36 are outer layer dummy internal conductors each formed on a different level from the first and the second internal electrodes 12 and 13.

The dummy internal conductors 35 and 36 have exposed portions at the end surfaces 7 and 8 of the ceramic base body 2 as in the case of the internal electrodes 12 and 13, and these exposed portions are also covered with the respective first and second external terminal electrodes 9 and 10 and are connected to the Cu plating films 20 (see FIG. 4). As a metal contained in the dummy internal conductors 35 and 36, a metal reactive with Cu contained in the Cu plating films 20 is preferably used. Accordingly, a bonding force of each of the external terminal electrodes 9 and 10 to the ceramic base body 2 can be further improved. In addition, the dummy internal conductors 35 and 36 each preferably include the same metal as that contained in the internal electrodes 12 and 13, and for example, Ni or Cu may be used as a metal to be contained in the dummy internal conductors 35 and 36.

As shown in FIGS. 9A to 9D, the dummy internal conductors 35 and 36 are each preferably formed to have the same width as that of each of the extension portions 17 and 19 of the internal electrodes 12 and 13. In addition, as shown by FIGS. 9A and 9B, a pattern formed by two outer layer dummy internal conductors 36 that are provided on a level is the same as that formed by one first internal electrode 12 and an inner layer dummy internal conductor 35 that are provided on a level. As shown by FIGS. 9C and 9D, a pattern formed by one second internal electrode 13 and an inner layer dummy internal conductor 35 that are provided on a level is the same as that formed by two outer layer dummy internal conductors 36 that are provided on a level. Hence, the same manufacturing process can be commonly used for the internal electrodes and the dummy internal electrodes.

Figure 10:
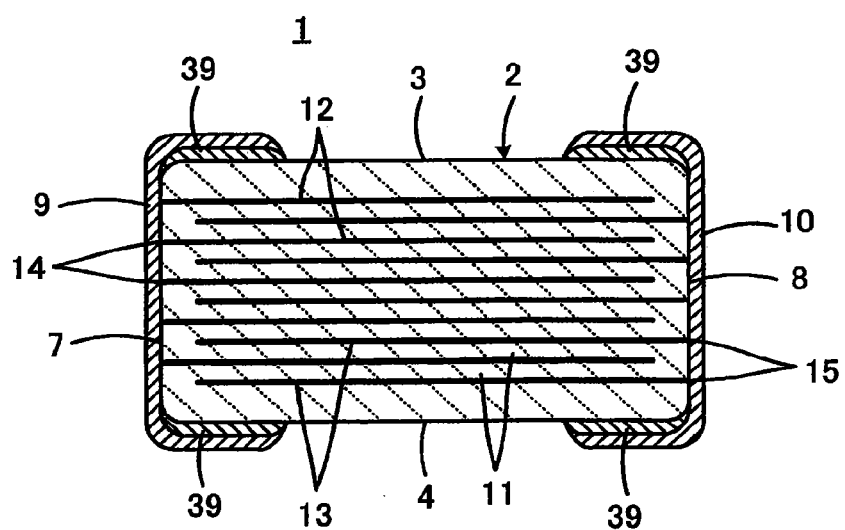
FIG. 10 is a cross-sectional view corresponding to FIG. 2 and illustrating a sixth embodiment of the present invention.
Figure 11:
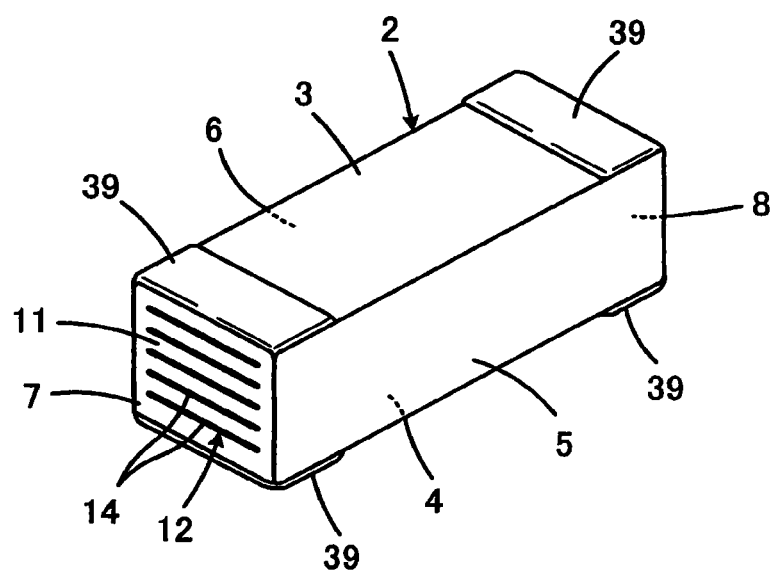
FIG. 11 is a perspective view illustrating the sixth embodiment of the present invention and showing the state of a ceramic base body 2 before external terminal electrodes 9 and 10 are formed.
Figure 12:
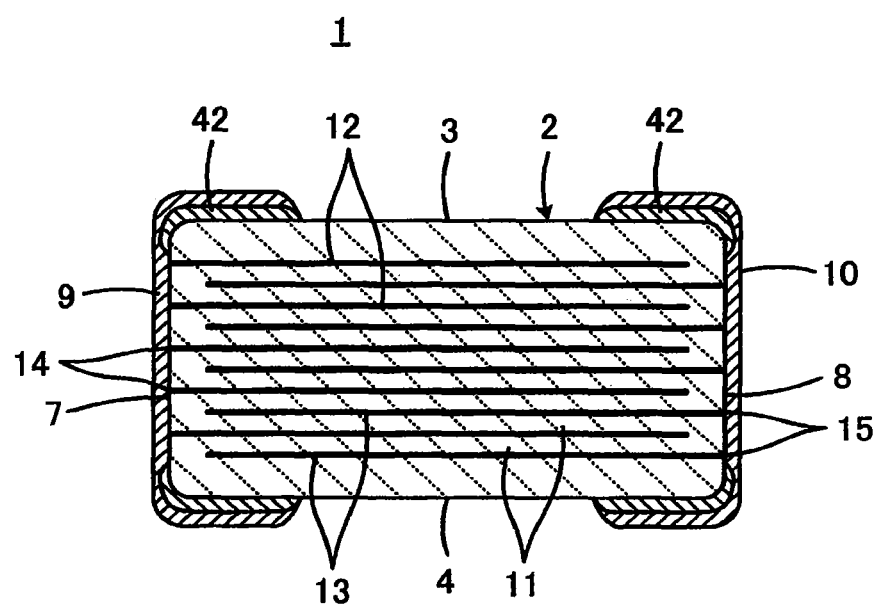
FIG. 12 is a cross-sectional view corresponding to FIG. 10 and illustrating a seventh embodiment of the present invention.

FIGS. 10 and 11 are views illustrating a sixth embodiment of the present invention. FIG. 10 corresponds to FIG. 2. FIG. 11 is a perspective view showing the ceramic base body 2 before the external terminal electrodes 9 and 10 are formed. In FIGS. 10 and 11, elements corresponding to the elements shown in FIGS. 1 and 2 are designated by the same reference numerals, and a duplicated description will be omitted.

In the sixth embodiment, auxiliary conductors 39 are formed on external surfaces of the ceramic base body 2 in regions other than the regions where the exposed portions 14 and 15 of the internal electrodes 12 and 13 appear and between the ceramic base body 2 and the external terminal electrodes 9 and 10. In more particularly, the auxiliary conductors 39 are formed on the two end portions of each of the first and the second primary surfaces 3 and 4 in the longitudinal direction thereof.

Since the Cu plating films 20 (see FIG. 4) of the external terminal electrodes 9 and 10 are formed by plating, they are unlikely to be formed in regions other than the regions where the exposed portions 14 and 15 of the internal electrodes 12 and 13 appear on the external surface of the ceramic base body 2; however, the auxiliary conductors 39 formed on the external surface of the ceramic base body 2 facilitate the formation of the Cu plating films 20 in larger areas. Accordingly, the Cu oxides 21 are precipitated in larger areas. Hence, the bonding force of the Cu plating film 20 to the ceramic base body 2 can be easily improved.

The auxiliary conductor 39 preferably includes a glass material. As the glass material, glass containing B and Si, such as borosilicate glass, may be used. The glass material may further contain at least one accessory component, such as Ba, Al, or Cu. The components of the glass material can be recognized, for example, by a mapping analysis using a wavelength dispersion type x-ray microanalyzer (WDX).

The auxiliary conductors 39 can be formed by placing ceramic green sheets on which conductive films to serve as the auxiliary conductors 39 are formed on a topmost layer and a bottommost layer of the ceramic base body 2 before fired and by firing the ceramic base body 2 including the ceramic green sheets with the conductive films for the auxiliary conductors 39. Alternatively, the auxiliary conductors 39 may be formed by printing a conductive paste on the first and the second primary surfaces 3 and 4 of the fired ceramic base body 2 and by baking the conductive paste. In this case, although the conductive paste is used, since the paste is applied only to the primary surfaces 3 and 4, the auxiliary conductor 39 can be formed to have a thickness of approximately 10 µm or less, and the total thickness including each of the external terminal electrodes 9 and 10 can be controlled to be approximately 30 µm or less.

After the auxiliary conductors 39 are formed, the end portions of the auxiliary conductors 39 are preferably rounded by a polishing treatment, such as barrel polishing.

FIGS. 12, 13, and 14A to 14F are views illustrating a seventh embodiment of the present invention. The seventh embodiment is a modified example of the sixth embodiment, and FIGS. 12 and 13 correspond to FIGS. 10 and 11, respectively. In FIGS. 12, 13, and 14A to 14F, elements corresponding to the elements shown in FIGS. 10 and 11 are designated by the same reference numerals, and a duplicated description will be omitted.

In the seventh embodiment, as in the case of the sixth embodiment, auxiliary conductors 42 are formed. In more particular, the auxiliary conductors 42 are formed on the two end portions of the first and the second primary surfaces 3 and 4 of the ceramic base body 2 in the longitudinal direction, the two end portions of the first and the second side surfaces 5 and 6 in the longitudinal direction, and the peripheral portions of the first and the second end surfaces 7 and 8.

FIGS. 14A to 14F are cross-sectional views showing a preferable method for forming the auxiliary conductors 42.

Figure 14A:
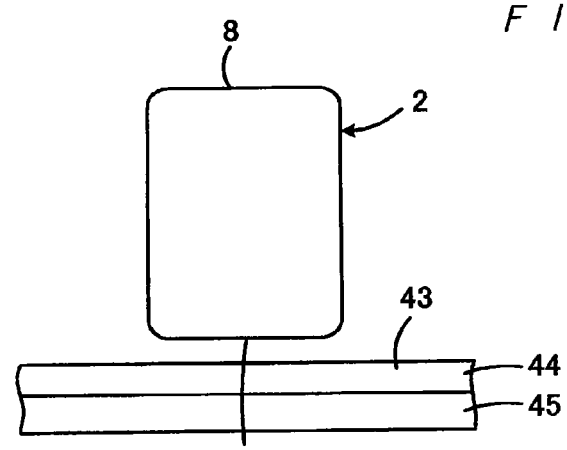
FIGS. 14A to 14F are cross-sectional views illustrating the seventh embodiment of the present invention and showing a preferable method for forming auxiliary conductors 42 shown in FIG. 13.

First, as shown in FIG. 14A, the ceramic base body 2 is prepared, and a flat plate 45 supporting a paste layer 44 composed of a conductive paste 43 is also prepared.

Figure 14D:
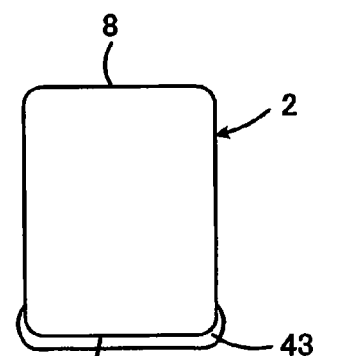
Figure 14B:
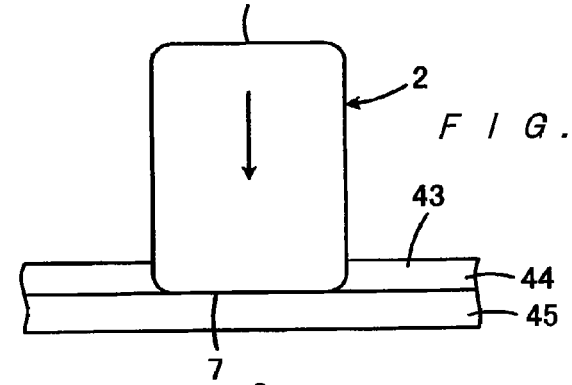
Figure 14E:
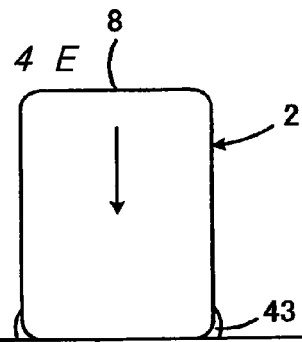
Figure 14C:
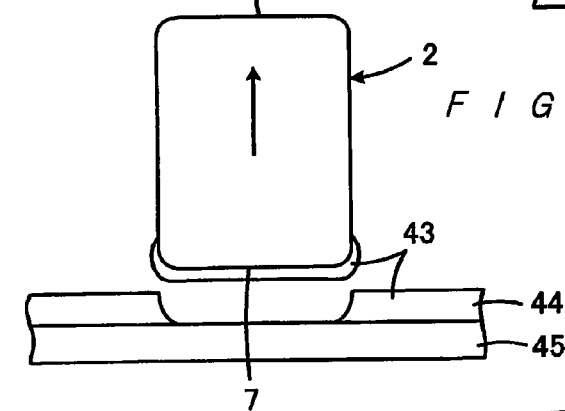

Next, as shown in FIG. 14B, the end surface 7 of the ceramic base body 2 is immersed in the paste layer 44, and then as shown in FIG. 14C, the ceramic base body 2 is pulled up. In this step, the conductive paste 43 adheres to the first end surface 7.

Subsequently, as shown in FIG. 14D, a flat plate 46 provided with no paste layer is prepared.

Figure 14F:
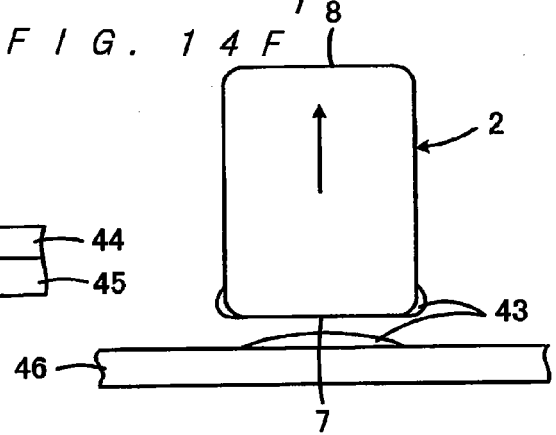

Next, as shown in FIG. 14E, the first end surface 7 is pushed against the flat plate 46, so that the conductive paste 43 on the first end surface 7 is squeezed out from the central portion to the peripheral portion of the first end surface 7. Next, as shown in FIG. 14F, when the ceramic base body 2 is pulled up, the conductive paste 43 almost does not adhere to the central portion of the first end surface 7.

The same process is performed for the second end surface 8 of the ceramic base body 2.

Figure 13:
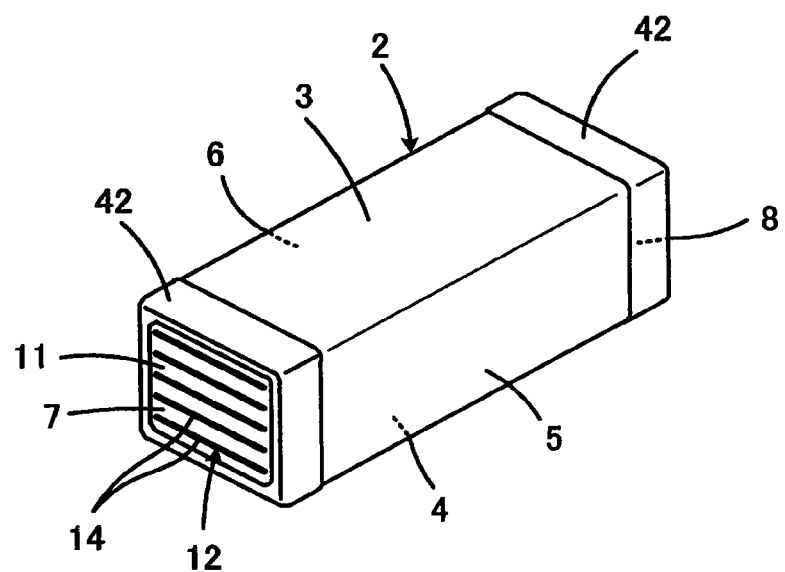
FIG. 13 is a perspective view corresponding to FIG. 11 and illustrating the seventh embodiment of the present invention.

Next, the conductive paste 43 is baked, so that the auxiliary conductors 42 are formed in the state as shown in FIG. 13. In the steps shown in FIGS. 14E and 14F, although the conductive paste 43 may remain on the central portion of each of the end surfaces 7 and 8 in some cases, a polishing treatment, such as barrel polishing, is performed after the formation of the auxiliary conductors 42 enables the exposed portions 14 and 15 of the internal electrodes 12 and 13 to appear on the end surfaces 7 and 8.

The auxiliary conductors 42 of the seventh embodiment have a functional effect similar to that of the auxiliary conductors 39 of the sixth embodiment. In the seventh embodiment, further, since the auxiliary conductors 42 are formed also on the first and the second side surfaces 5 and 6, the Cu plating films 20 (see FIG. 4) to serve as the external terminal electrodes 9 and 10 can be easily formed also on the first and the second side surfaces 5 and 6. Accordingly, Cu oxides 21 are precipitated also on the first and the second side surfaces 5 and 6, so that the bonding forces of the external terminal electrodes 9 and 10 to the ceramic base body 2 are improved. In addition, since the auxiliary conductors 42 are formed so as to extend to the first and the second side surfaces 5 and 6, for example, the outer layer dummy internal conductors 36 of the fifth embodiment may not be necessarily formed.

In addition, also in the seventh embodiment, since the thickness of the auxiliary conductors 42 can be decreased by scraping out an excessive part of the conductive paste 43, the total thickness of each of the auxiliary conductors 42 and each of the external terminal electrodes 9 and 10 formed thereon can be approximately 30 µm or less.

Figure 15:
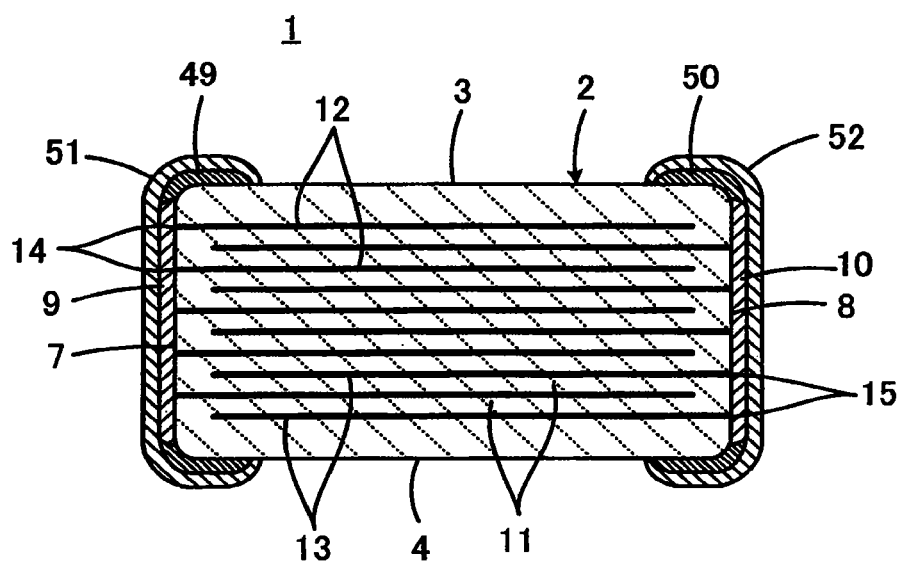
FIG. 15 is a cross-sectional view corresponding to FIG. 2 and illustrating an eighth embodiment of the present invention.

FIGS. 15 and 16A to 16F are views illustrating an eighth embodiment of the present invention. FIG. 15 corresponds to FIG. 2. In FIG. 15, elements corresponding to the elements shown in FIG. 2 are designated by the same reference numerals, and a duplicated description will be omitted.

In the eighth embodiment, the first external terminal electrode 9 is formed only on the first end surface 7, and the second external terminal electrode 10 is formed only on the second end surface 8. Hence, even by a method in which plating films are deposited using the exposed portions 14 and 15 of the internal electrodes 12 and 13 located at the end surfaces 7 and 8 of the ceramic base body 2 as nuclei and are grown so as to connect the exposed portions 14 of the internal electrodes 12 to one another and to connect the exposed portions 15 of the internal electrodes 13 to one another, the external terminal electrodes 9 and 10 can be formed for a relatively short period of time.

In the eighth embodiment, a first edge-side conductor 49 is formed on respective end portions of the first and the second primary surfaces 3 and 4 and the first and the second side surfaces 5 and 6 that are bordering the first end surface 7 to enclose the first external electrode 9 and to be electrically connected to the first external electrode 9. Likewise, a second edge-side conductor 50 is formed on respective end portions of the first and the second primary surfaces 3 and 4 and the first and the second side surfaces 5 and 6 that are bordering the second end surface 8 to enclose the second external electrode 10 and to be electrically connected to the second external terminal electrode 10.

The first and the second edge-side conductors 49 and 50 preferably contain a glass material as in the case of the above-described auxiliary conductors 39 and 42. The edge-side conductors 49 and 50 are formed, for example, by applying a conductive paste, followed by baking. The baking of the conductive paste may be performed after the firing of the ceramic base body 2 or simultaneously therewith.

According to the eighth embodiment, the first and the second edge-side conductors 49 and 50 are formed on the respective end portions of the first and the second primary surfaces 3 and 4 and the first and the second side surfaces 5 and 6 of the ceramic base body 2 so as to enclose the first and the second end surfaces 7 and 8 and to be electrically connected to the peripheries of the first and the second external terminal electrodes 9 and 10, respectively, and the bonding reliability at the time of mounting the multilayer ceramic capacitor 1 by soldering can be improved. In addition, the edge-side conductors 49 and 50 suppress the intrusion of moisture and the like into the ceramic base body 2 from the outside of the external terminal electrodes 9 and 10, the reliability of the multilayer ceramic capacitor 1 can be improved.

In the eighth embodiment, preferably, an outside plating film 51 is further formed on the first external terminal electrode 9 and the first edge-side conductor 49, and an outside plating film 52 is further formed on the second external terminal electrode 10 and the second edge-side conductor 50. When a metal having superior solder wettability is used for the outside plating films 51 and 52, the bonding reliability of the multilayer ceramic capacitor 1 in mounting by soldering can be surely improved. The metal having superior solder wettability is, for example, Sn or Au.

The outside plating films 51 and 52 may be of a two-layer structure including a Ni plating layer as an underlayer and an Sn plating layer as an overlay or may be of a structure including three layers or more as well as of a single layer structure.

FIGS. 16A to 16F are cross-sectional views showing a preferable method for forming the edge-side conductors 49 and 50. FIGS. 16A to 16F correspond to FIGS. 14A to 14F. In FIGS. 16A to 16F, elements corresponding to the elements shown in FIGS. 14A to 14F are designated by the same reference numerals, and a duplicated description will be omitted.

Figure 16:
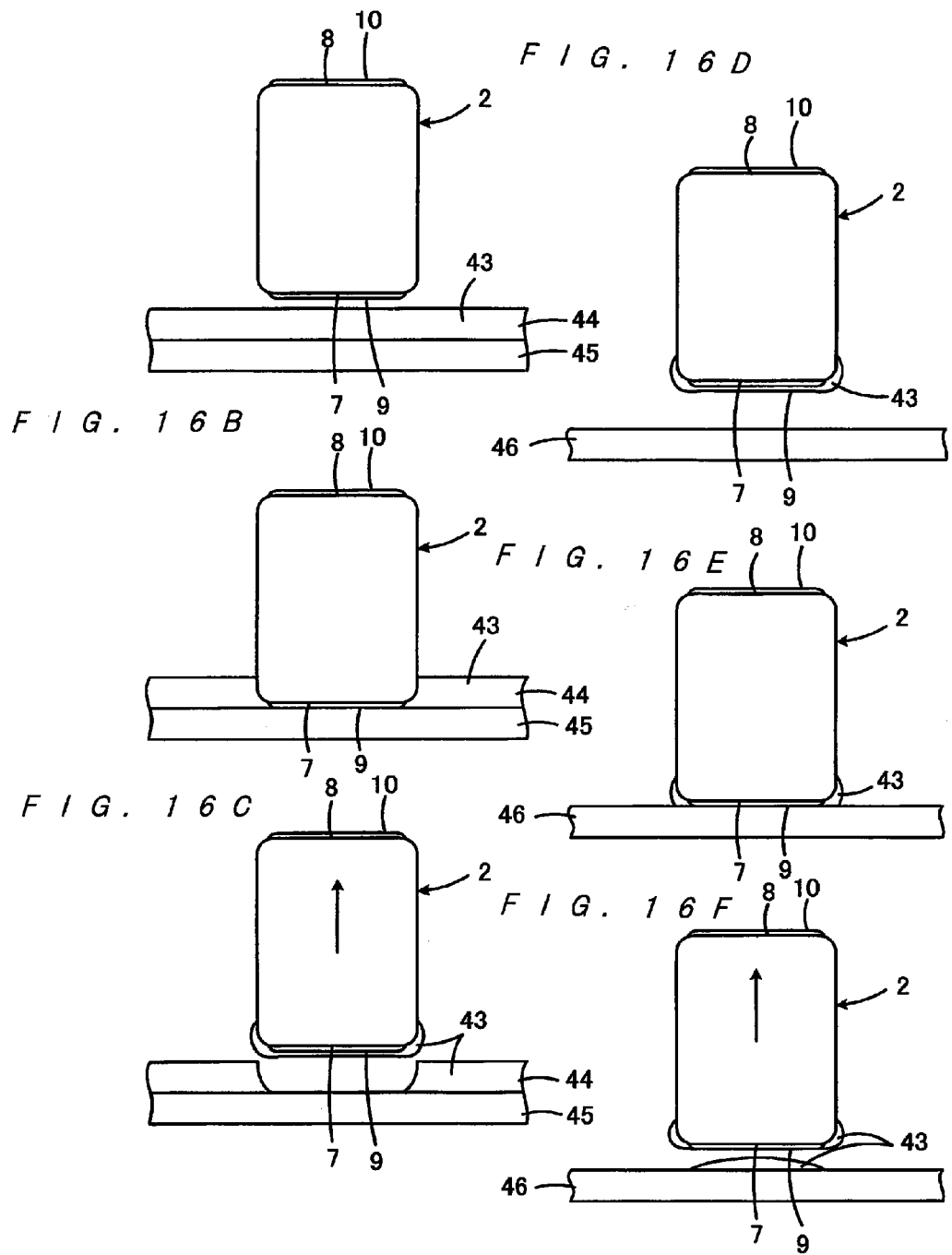
FIGS. 16A to 16F are cross-sectional views illustrating the eighth embodiment of the present invention and showing a preferable method for forming edge-side conductors 49 and 50 shown in FIG. 15.

First, as shown in FIG. 16A, the ceramic base body 2 provided with the external terminal electrodes 9 and 10 is prepared, and the flat plate 45 supporting the paste layer 44 composed of the conductive paste 43 is also prepared.

Next, as shown in FIG. 16B, the first end surface 7 of the ceramic base body 2 and the first external terminal electrode 9 are immersed in the paste layer 44, and then as shown in FIG. 16C, the ceramic base body 2 is pulled up. In this step, the conductive paste 43 adheres so as to cover the first end surface 7 and the first external terminal electrode 9.

Subsequently, as shown in FIG. 16D, the flat plate 46 provided with no paste layer is prepared.

Next, as shown in FIG. 16E, the first external terminal electrode 9 provided on the first end surface 7 is pushed against the flat plate 46, so that the conductive paste 43 is squeezed from the first external electrode 9 toward the peripheral portion thereof. Next, as shown in FIG. 16F, when the ceramic base body 2 is pulled up, the conductive paste 43 almost does not adhere to the first end surface 7 except the peripheral portion of the first external terminal electrode 9.

The same process is performed for the second end surface 8 of the ceramic base body 2 provided with the second external terminal electrode 10.

Subsequently, the conductive paste 43 is baked, and as a result, the edge-side conductors 49 and 50 in the state as shown in FIG. 15 are formed.

Figure 17:
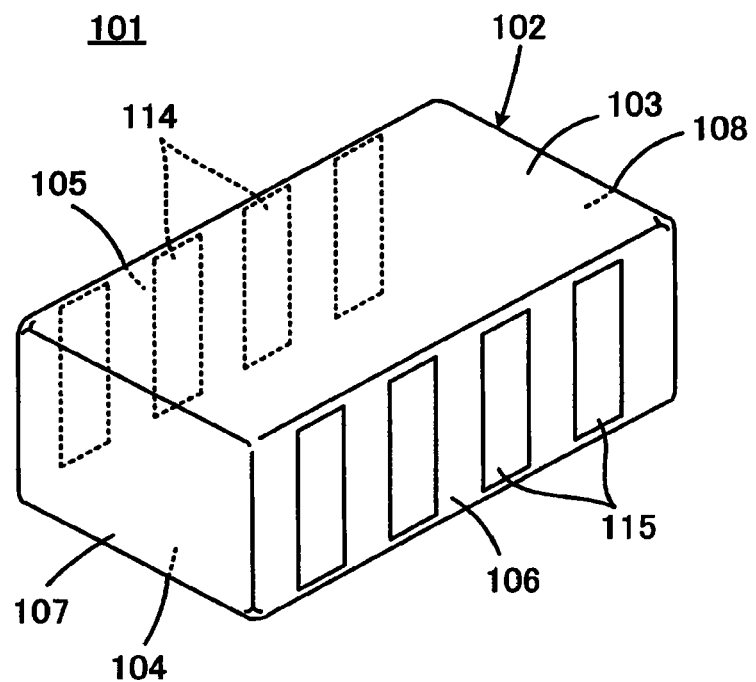
FIG. 17 is a perspective view showing the appearance of a multilayer ceramic capacitor array 101 according to a ninth embodiment of the present invention.
Figure 18A:
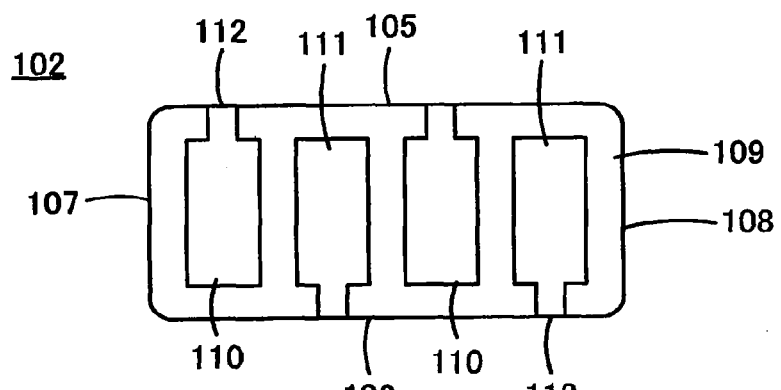
FIGS. 18A and 18B are plan views showing the internal structure of a ceramic base body 102 of the multilayer ceramic capacitor array 101 shown in FIG. 17.
Figure 18B:
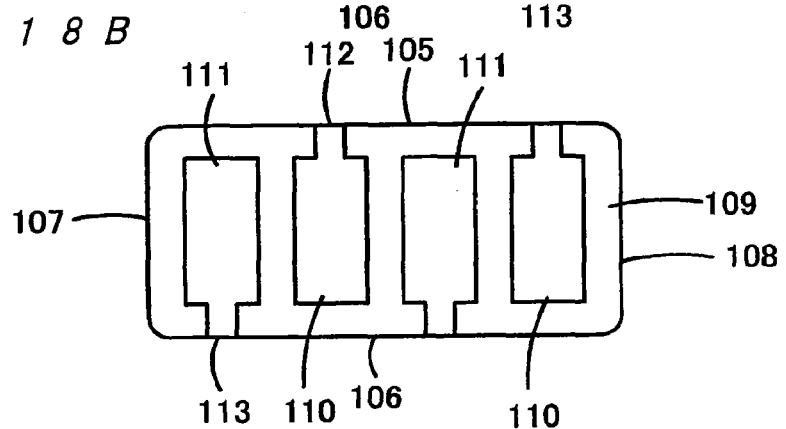
Figure 19:
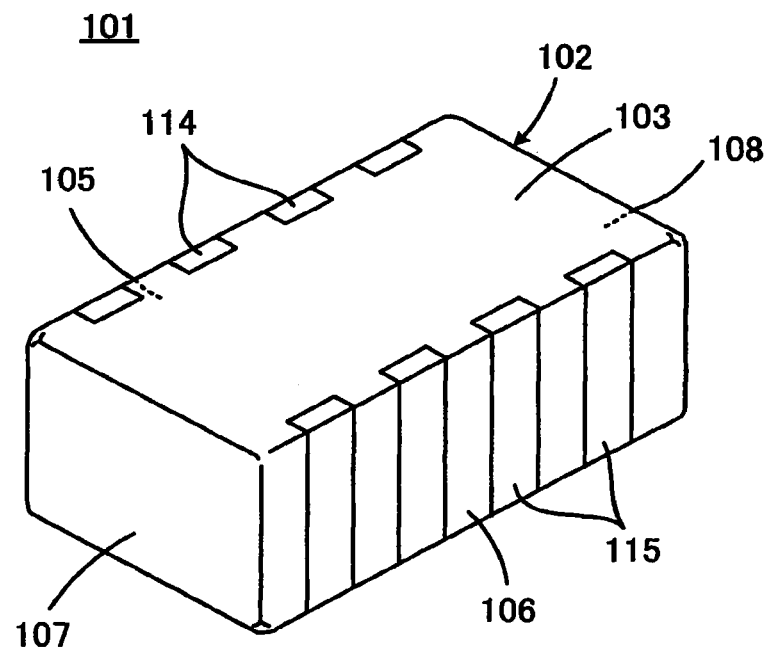
FIG. 19 is a perspective view corresponding to FIG. 17 and illustrating a tenth embodiment of the present invention.
Figure 20:
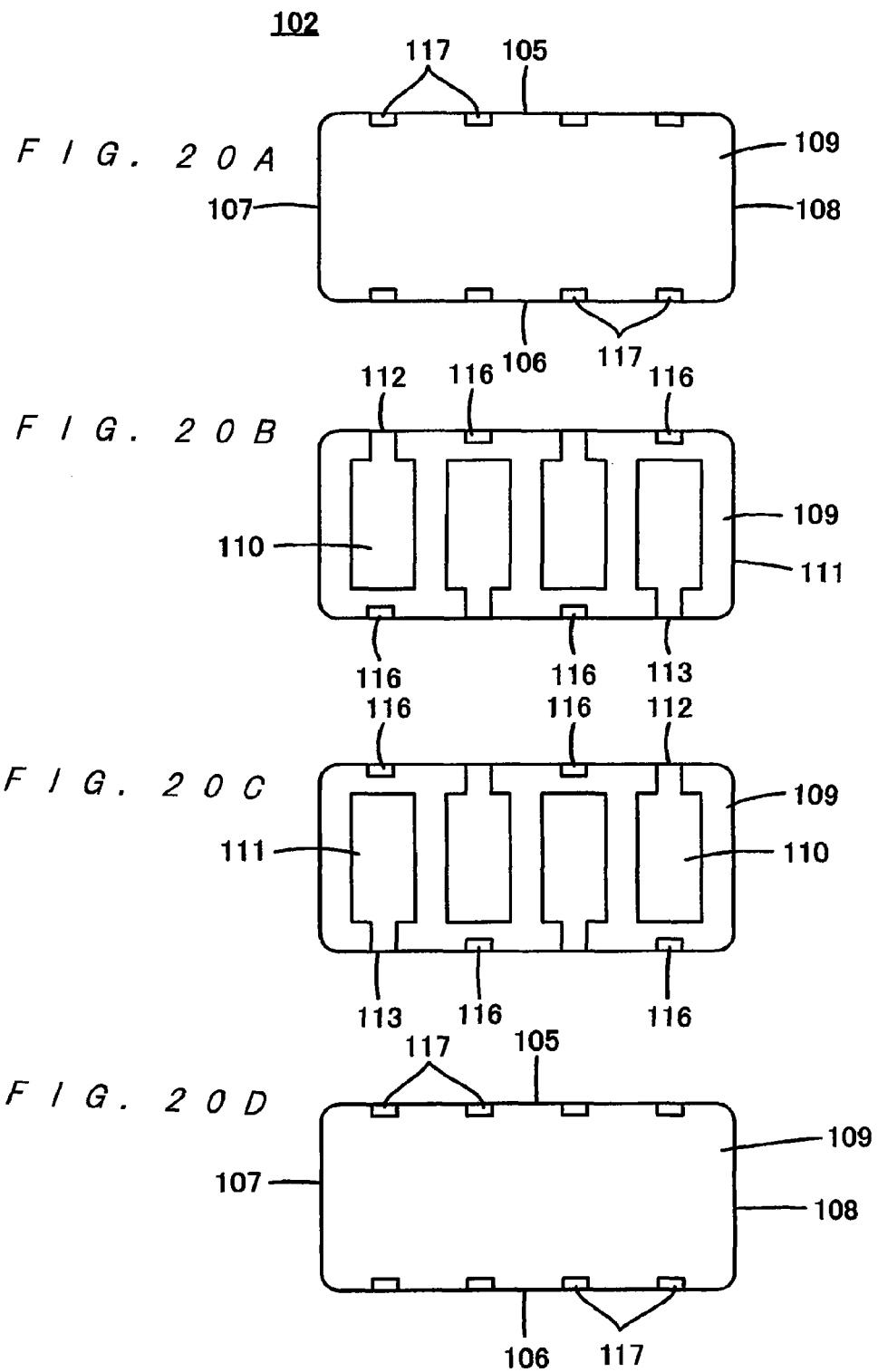
FIGS. 20A to 20D are views corresponding to FIGS. 18A and 18B and illustrating the tenth embodiment of the present invention.
Figure 21:
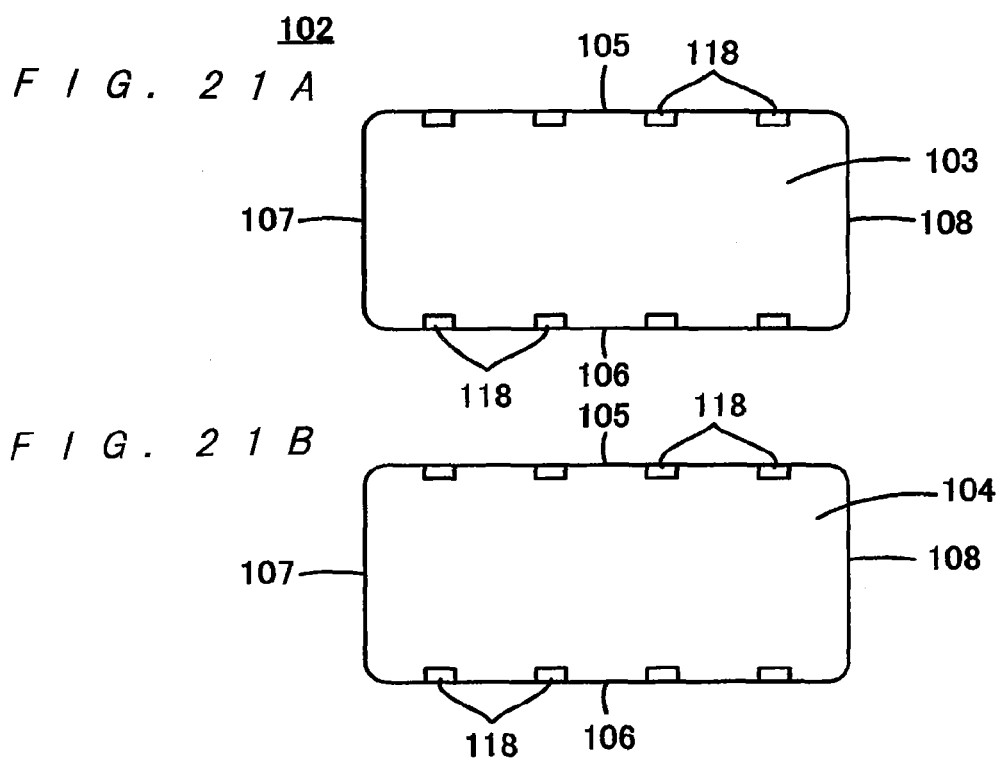
FIGS. 21A and 21B are views illustrating the tenth embodiment of the present invention and showing a first and a second primary surface 103 and 104, respectively, of the ceramic base body 102 before external terminal electrodes 114 and 115 are formed.

FIGS. 17, 18A, and 18B are views illustrating a ninth embodiment of the present invention. FIG. 17 is a perspective view showing a multilayer ceramic capacitor array 101 as one example of a multilayer ceramic electronic component.

The multilayer ceramic capacitor array 101 has a ceramic base body 102. The ceramic base body 102 is in the shape of a substantially rectangular parallelepiped having a first primary surface 103 and a second primary surface 104 facing to each other, and a first side surface 105, a second side surface 106, a third side surface 107 and a fourth side surface 108 connecting the first and the second primary surfaces 103 and 104 to each other.

FIGS. 18A and 18B are plan views showing the internal structure of the ceramic base body 102 and showing cross-sections taken at different levels. The ceramic base body 102 has a structure in which ceramic layers 109 are stacked one upon another. Inside the ceramic base body 102, first internal electrodes 110 and second internal electrodes 111 are alternately with ceramic layers 109 thereamong in the direction in which the ceramic layers 109 are stacked and also in the direction along longer sides of the primary surfaces 103 and 104. In this embodiment, two first internal electrodes 110 and two second internal electrodes 111 are alternately disposed in the direction along the longer sides of the primary surfaces 103 and 104. Each of the first internal electrodes 110 has an exposed portion 112 exposed at the first side surface 105, and each of the second internal electrodes 111 has an exposed portion 113 exposed at the second side surface 106.

As shown in FIG. 17, four first external terminal electrodes 114 and four external terminal electrodes 115 are formed on the first and the second side surfaces 105 and 106, respectively, of the ceramic base body 102. The exposed portions 112 of the first internal electrodes 110 are covered with the first external terminal electrodes 114 and are electrically connected thereto. The exposed portions 113 of the second internal electrodes 111 are covered with the second external terminal electrodes 115 and are electrically connected thereto.

Although not shown in the figure, the structure of the external terminal electrode 9 and the formation method thereof described with reference to FIGS. 4, 5, 6, and 7 may also be applied to the first and the second external terminal electrodes 114 and 115 of the multilayer ceramic capacitor array 101 described above.

In a multi-terminal type multilayer ceramic electronic component such as the capacitor array 101 according to the ninth embodiment, a solder bridge must be prevented by maintaining the distance between adjacent external terminal electrodes to a certain extent. In the case of adopting a conductive paste application method to form the external terminal electrodes, however, it is difficult to apply a conductive paste in precise positions; hence, the distance between exposed internal electrodes must be ensured to be slightly larger, and as a result, the reduction in size has been inhibited. On the other hand, according to the present invention, direct plating is used for forming the external terminal electrodes, the distance between the exposed internal electrodes can be minimized, and hence the reduction in size of the multilayer ceramic electronic component can be further advanced.

In the ninth embodiment, 8 terminals, that is, 8 lines of the exposed portions 112 and 113 of the internal electrodes 110 and 111 are formed; however, at least 4 lines of the exposed portions may be formed, and the number of the external terminal electrodes may be at least four or a number corresponding to the number of the lines.

FIGS. 19 to 21D are views illustrating a tenth embodiment of the present invention. FIG. 19 and FIGS. 20A to 20D correspond to FIG. 17 and FIGS. 18A and 18B, respectively. FIGS. 21A and 21B are views showing the first and the second primary surfaces 103 and 104, respectively, of the ceramic base body 102 before the external terminal electrodes 114 and 115 are formed. In FIGS. 19 to 21B, elements corresponding to the elements shown in FIGS. 17, 18A, and 18B are designated by the same reference numerals, and a duplicated description will be omitted.

In the tenth embodiment, as shown in FIGS. 20A to 20D, inner layer dummy internal conductors 116 are formed on the same levels with the first and the second internal electrode 110 or 111, and outer layer dummy internal conductors 117 are formed on different levels from the first and the second internal electrodes 110 and 111. Further, as shown in FIGS. 21A and 21B, auxiliary conductors 118 are formed on the first and the second primary surfaces 103 and 104 of the ceramic base body 102.

The dummy internal conductors 116 and 117 have a functional effect similar to that of the dummy internal conductors 35 and 36 of the fifth embodiment, and the auxiliary conductors 118 have a functional effect similar to that of the auxiliary conductors 39 of the sixth embodiment. Hence, according to the tenth embodiment, as compared to the ninth embodiment, the bonding forces of the first and the second external terminal electrodes 114 and 115 to the ceramic base body 102 can be further improved, and in addition, the first and the second external terminal electrodes 114 and 115 can be formed to extend to the primary surfaces 103 and 104.

In the tenth embodiment, the dummy internal conductors 116 and 117 may be omitted, or the auxiliary conductors 118 may be omitted.

Figure 22:
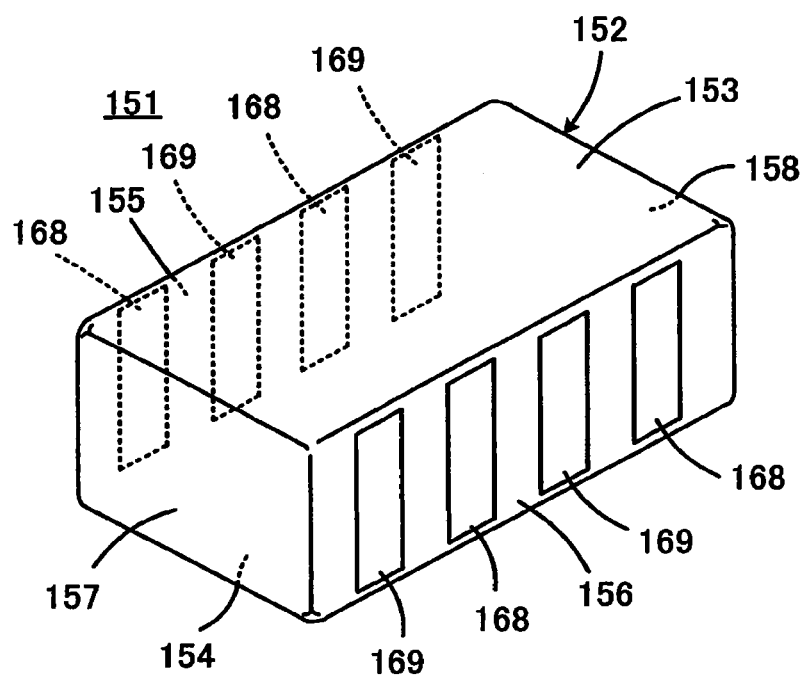
FIG. 22 is a perspective view showing the appearance of a multi-terminal type low-ESL multilayer ceramic capacitor 151 according to an eleventh embodiment of the present invention.
Figure 23A:
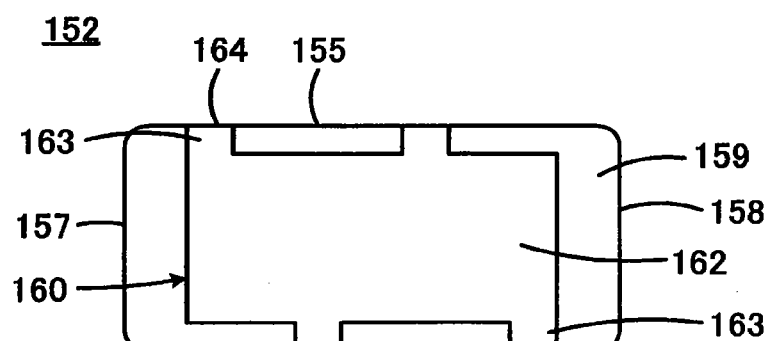
FIGS. 23A and 23B are plan views showing the internal structure of a ceramic base body 152 of the multilayer ceramic capacitor 151 shown in FIG. 22.
Figure 23B:
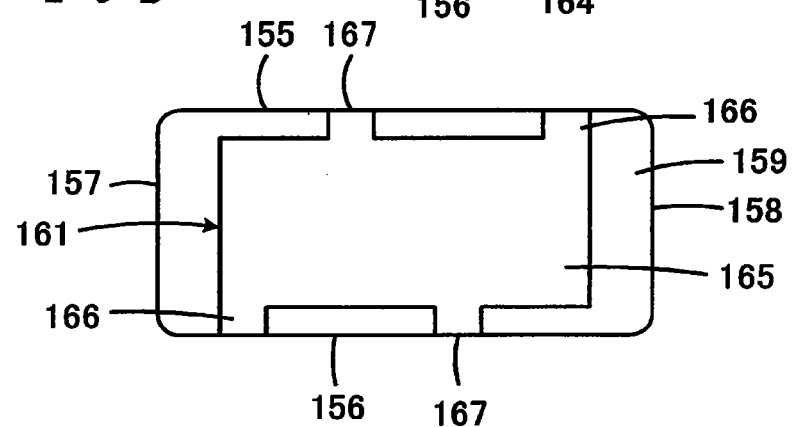

FIGS. 22, 23A and 23B are views illustrating an eleventh embodiment of the present invention. FIG. 22 is a perspective view showing a multi-terminal type low-ESL (equivalent series inductance) multilayer ceramic capacitor 151 as one example of a multilayer ceramic electronic component.

The low-ESL multilayer ceramic capacitor 151 has a ceramic base body 152. The ceramic base body 152 is in the shape of a substantially rectangular parallelepiped having a first and a second primary surface 153 and 154 facing each other, and a first to a fourth side surface 155 to 158 connecting the first and the second primary surfaces 153 and 154 to each other.

FIGS. 23A and 23B are plan views showing the internal structure of the ceramic base body 152 and showing cross-sections taken at different levels.

The ceramic base body 152 has the structure in which ceramic layers 159 are stacked one upon another. Inside the ceramic base body 152, first internal electrodes 160 and second internal electrodes 161 are alternately arranged with ceramic layers 159 thereamong in the direction in which the ceramic layers 159 are stacked.

Each of the first internal electrodes 160 has a first capacity portion 162 facing the second internal electrode 161 and first extension portions 163 extended from the first capacity portion 162 to the first and the second side surfaces 155 and 156, and the first extension portions 163 end in exposed portions 164 at the first and the second side surfaces 155 and 156.

Each of the second internal electrodes 161 has a second capacity portion 165 facing the first internal electrode 160 and second extension portions 166 extended from the second capacity portion 165 to the first and the second side surfaces 155 and 156, and the second extension portions 166 end in exposed portions 167 at the first and the second side surfaces 155 and 156.

First and second external terminal electrodes 168 and 169 are alternately formed on the first and the second side surfaces 155 and 156 of the ceramic base body 152. The exposed portions 164 of the first internal electrodes 160 are covered with the first external terminal electrodes 168 and are electrically connected thereto. The exposed portions 167 of the second internal electrodes 161 are covered with the second external terminal electrodes 169 and are electrically connected thereto.

The structure of the external terminal electrode 9 and the formation method thereof described with reference to FIGS. 4, 5, 6, and 7 may also be applied to the first and the second external terminal electrodes 168 and 169 of this eleventh embodiment.

Figure 24:
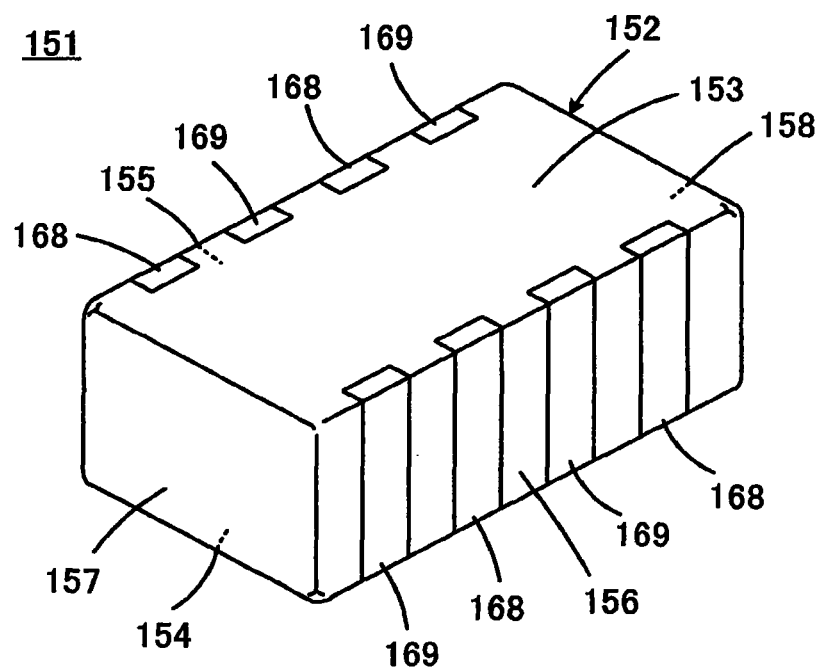
FIG. 24 is a perspective view corresponding to FIG. 22 and illustrating a twelfth embodiment of the present invention.
Figure 25A:
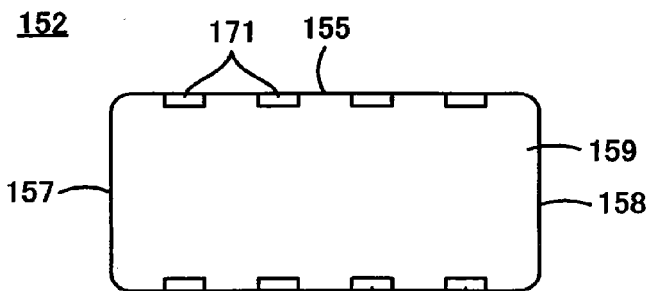
FIGS. 25A to 25D are plan views corresponding to FIGS. 23A and 23B and illustrating the twelfth embodiment of the present invention.
Figure 25B:
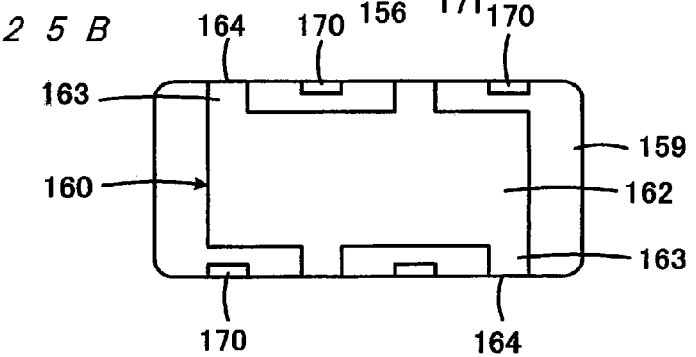
Figure 25C:
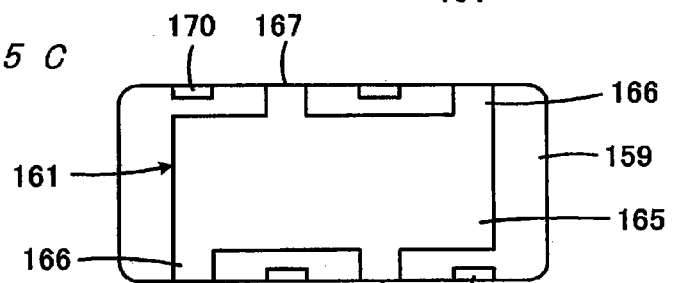
Figure 25D:
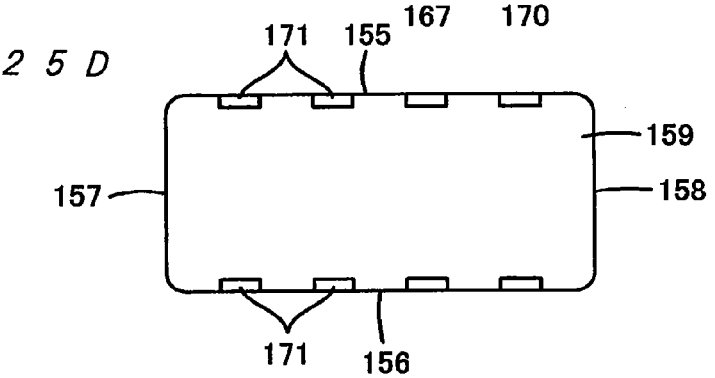

FIGS. 24 to 26B are views illustrating a twelfth embodiment of the present invention. FIG. 24 corresponds to FIG. 22, and FIGS. 25A to 25D correspond to FIGS. 23A and 23B. FIGS. 26A and 26B are views showing the first and the second primary surfaces 153 and 154 of the ceramic base body 152. In FIGS. 24 to 26B, elements corresponding to the elements shown in FIGS. 22, 23A, and 23B are designated by the same reference numerals, and a duplicated description will be omitted.

The relationship of the twelfth embodiment to the eleventh embodiment is similar to that of the tenth embodiment to the ninth embodiment. That is, in the twelfth embodiment, as shown in FIGS. 25A to 25D, inner layer dummy internal conductors 170 are formed on the same levels with the first and the second internal electrodes 160 and 161, and outer layer dummy internal conductors 171 are formed on different levels from the first and the second internal electrodes 160 and 161. Further, as shown in FIGS. 26A and 26B, auxiliary conductors 172 are formed on the first and the second primary surfaces 153 and 154 of the ceramic base body 152.

The dummy internal conductors 170 and 171 have a functional effect similar to that of the dummy internal conductors 35 and 36 of the fifth embodiment, and the auxiliary conductors 172 have a functional effect similar to that of the auxiliary conductors 39 of the sixth embodiment. Hence, according to the twelfth embodiment, as compared to the eleventh embodiment, the bonding forces of the first and the second external terminal electrodes 168 and 169 to the ceramic base body 152 can be improved, and in addition, the first and the second external terminal electrodes 168 and 169 can be formed to extend to the first and the second primary surfaces 153 and 154.

In the twelfth embodiment, the dummy internal conductors 170 and 171 may be omitted, or the auxiliary conductors 172 may be omitted.

FIGS. 27 and 28A to 28G are views illustrating a thirteenth embodiment of the present invention. FIG. 27 is a perspective view showing a multilayer ceramic inductor 201 as one example of a multilayer ceramic electronic component.

The multilayer ceramic inductor 201 has a ceramic base body 202. The ceramic base body 202 is in the shape of a substantially rectangular parallelepiped having a first and a second primary surface 203 and 204, and four side surfaces 205 to 208 connecting the first and the second primary surfaces 203 and 204 to each other. In the following description, among the four side surfaces 205 to 208, the side surfaces 205 and 206 extending along the longer sides of the primary surfaces 203 and 204 are called a first and a second side surface, respectively, and the side surfaces 207 and 208 extending along the shorter sides of the primary surfaces 203 and 204 are called a first and a second end surface, respectively.

A first and a second external terminal electrode 209 and 210 are formed on the first and the second end surfaces 207 and 208, respectively, of the ceramic base body 202.

FIGS. 28A to 28G are perspective views exploded parts of the ceramic base body 202 of the multilayer ceramic inductor 201.

The ceramic base body 202 has the structure in which ceramic layers 211 are stacked one upon another. Inside the ceramic base body 202, a first internal conductor 213 and a second internal conductor 215 are disposed at mutually different levels in the direction in which the ceramic layers 211 are stacked. The first internal conductor 213 has an exposed portion 212 at the first end surface 207, and the second internal conductor 215 has an exposed portion 214 at the second end surface 208. The exposed portion 212 of the first internal conductor 213 is covered with the first external terminal electrode 209 so as to be electrically connected thereto. The exposed portion 214 of the second internal conductor 215 is covered with the second external terminal electrode 210 so as to be electrically connected thereto.

In addition, in the ceramic base body 202, a coil conductor 216 that coils to electrically connect the first internal conductor 213 and the second internal conductor 215 to each other. The coil conductor 216 is formed from several line conductors 217 extending on predetermined ceramic layers 211 and several via-hole conductors 218 penetrating the predetermined ceramic layers 211 in the thickness direction. Thus, the coil conductor 216 is formed three-dimensionally in the ceramic base body 202.

In addition, the multilayer ceramic inductor 201 has several dummy internal conductors 219 which are not substantially responsible for electrical properties. The dummy internal conductors 219 each have an exposed portion exposed at the first end surface 207 or the second end surface 208 at a position adjacent to the exposed portion 212 or 214 of the first or the second internal conductors 213 or 215. The dummy internal electrodes 219 have a function of further improving bonding forces of the first and the second external terminal electrodes 209 and 210 to the ceramic base body 202.

Heretofore, although the present invention has been described with reference to the embodiments shown in the figures, the present invention may also be applied to other multilayer ceramic electronic components, such as a multilayer piezoelectric electronic component and a multilayer thermistor.

Next, an experiment performed in order to confirm the effect of the present invention will be described. In the experiment, multilayer ceramic capacitors according to the second embodiment were fabricated, and the multilayer ceramic capacitors were evaluated.

First, ceramic base bodies for the multilayer ceramic capacitors were prepared in accordance with the specification shown by Table 1 below.

TABLE 1

| Dimensions | 1.0 mm long, 0.5 mm wide, and 0.5 mm high |
|---|---|
| Material for ceramic layer | Barium titanate-based dielectric ceramic |

TABLE 1-continued

| Metal for internal electrode | Ni as primary component |
|---|---|
| Number of lamination layers | 220 |
| Thickness of ceramic layer | 1.5 μm |
| Rated voltage | 6.3 V |
| Electrostatic capacity | 2.2 μF |

Next, External terminal electrodes were formed on each of the ceramic base bodies. By using plating baths as shown by Table 2 below, Cu strike plating and Cu thick plating were performed under plating conditions shown in Table 3 using a horizontally rotating barrel. Thereby, Cu plating films having a thickness of approximately 10 μm were formed.

TABLE 2

Cu strike plating 14 g/l copper pyrophosphate
120 g/l pyrophosphoric acid
10 g/l potassium oxalate
Bath temperature: 25° C.
pH: 8.5

Cu thick plating

"Pyrobrite system" manufactured by C Uyemura & Co., Ltd.
Bath temperature: 55° C.
pH: 8.8

Ni plating

Watt bath (weakly acidic simple nickel bath)
Bath temperature: 60° C.
pH: 4.2

Sn plating

"Sn-235" manufactured by Dipsol Chemical Co., Ltd.
Bath temperature: 33° C.
pH: 5.0

TABLE 3

| Number of revolutions of horizontally rotating barrel | 10 rpm |
|---|---|
| Conductive medium | 1.8 mm in diameter |
| | Current density × time |
| Cu strike plating | 0.11 A/dm$^2$ × 60 minutes |
| Cu thick plating | 0.30 A/dm$^2$ × 60 minutes |
| Ni plating | 0.20 A/dm$^2$ × 60 minutes |
| Sn plating | 0.10 A/dm$^2$ × 60 minutes |

Next, heat treatments under conditions shown in Table 4 below were performed for the respective ceramic base bodies.

TABLE 4

| | Heat treatment conditions | | |
|---|---|---|---|
| Example No. | Temperature (° C.) | Oxygen concentration (ppm) | Time (hours) |
| 1 | No heat treatment | | |
| 2 | 800 | 10 | 0.5 |
| 3 | 800 | 50 | 0.5 |
| 4 | 800 | 100 | 0.5 |
| 5 | 1,000 | 10 | 0.5 |
| 6 | 1,000 | 50 | 0.5 |
| 7 | 1,000 | 100 | 0.5 |
| 8 | 1,065 | 10 | 0.5 |
| 9 | 1,065 | 50 | 0.5 |
| 10 | 1,065 | 100 | 0.5 |
| 11 | 1,080 | 10 | 0.5 |

TABLE 4-continued

| | Heat treatment conditions | | |
|---|---|---|---|
| Example No. | Temperature (°C.) | Oxygen concentration (ppm) | Time (hours) |
| 12 | 1,080 | 50 | 0.5 |
| 13 | 1,080 | 100 | 0.5 |

After the heat treatment, each of the ceramic base bodies were subjected to Ni plating and Sn plating. More specifically, on each of the ceramic base bodies, a Ni plating film with a thickness of approximately 4 μm was formed, and on the Ni plating film, an Sn plating film with a thickness of approximately 4 μm was formed. The formation of these plating films were performed by using the plating baths shown in the above Table 2, specifically using a horizontally rotating barrel, under the plating conditions shown in Table 3. In this way, samples of examples 1 to 13 were obtained.

Next, the samples thus obtained were evaluated in the bonding force of external terminal electrode by the following method. A shear fracture was caused in each of the samples, and the boding force of the external terminal electrodes of each sample was determined by the state of the shear fracture. More specifically, the multilayer ceramic capacitor of each sample was mounted on a substrate by soldering, and a load was applied thereto in a direction parallel to the two external terminal electrodes at a loading speed of 0.5 mm/second until a fracture occurred. Then, the mode of the fracture was observed. The following Table 5 shows the position at which the fracture occurred with respect to each sample. In addition, among 10 samples of each example, the number of samples that had a fracture between the Cu plating film and the ceramic base body, that is, the number of samples that had electrode peeling, is also shown in Table 5 as "defective fraction".

Furthermore, a humidity-resistance reliability test was performed. After a voltage of 3.2 V was applied to the samples for 72 hours under the conditions at 125° C. and 95% RH, the insulating resistances of the samples were measured, and the samples that had insulating resistances of 1 MΩ or less were determined as defectives. The number of defectives among 20 samples of each example is shown in Table 5 as "humidity-resistance reliability defective fraction".

TABLE 5

| | Evaluation of bonding force | | Humidity-resistance |
|---|---|---|---|
| Example No. | Defective fraction | Fractured position | reliability defective fraction |
| 1 | 10/10 | Between Cu plating film and ceramic base body | 19/20 |
| 2 | 9/10 | Same as above | 8/20 |
| 3 | 10/10 | Same as above | 5/20 |
| 4 | 10/10 | Same as above | 6/20 |
| 5 | 10/10 | Same as above | 5/20 |
| 6 | 9/10 | Same as above | 7/20 |
| 7 | 8/10 | Same as above | 5/20 |
| 8 | 10/10 | Same as above | 4/20 |
| 9 | 0/10 | Inside ceramic base body | 0/20 |
| 10 | 0/10 | Inside ceramic base body | 0/20 |
| 11 | 9/10 | Between Cu plating film and ceramic base body | 4/20 |
| 12 | 0/10 | Inside ceramic base body | 0/20 |
| 13 | 0/10 | Inside ceramic base body | 0/20 |

As shown in Table 5, samples of Examples 1 to 8 and 11 had fractures between the respective Cu plating film and the respective ceramic base bodies and were inferior in the humidity-resistance reliability; however, samples of Examples 9, 10, 12, and 13 had fractures inside the respective ceramic base bodies, and were superior in the humidity-resistance reliability. Accordingly, it was understood that when the heat treatment is performed at a temperature of 1,065° C. or more in an oxygen atmosphere at an oxygen concentration of 50 ppm or more, the external terminal electrodes can be fixed to the ceramic base body with sufficient strength and humidity resistance.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A method for manufacturing a multilayer ceramic electronic component, comprising the steps of:
   providing a ceramic base body which includes stacked ceramic layers and internal conductors, the internal conductors including exposed portions that are exposed at external surfaces of the ceramic base body;
   plating the ceramic base body to deposit Cu plating films directly on the exposed portions of the internal conductors; and
   heat treating the ceramic base body so as to generate Cu oxide in the Cu plating films, to make the multilayer ceramic electronic component.

2. The method for manufacturing a multilayer ceramic electronic component according to claim 1,
   wherein the heat treatment is performed at a temperature of 1,065° C. or more in an atmosphere with an oxygen concentration of 50 ppm or more.

* * * * *